United States Patent
Kumashiro

[11] Patent Number: 5,870,503
[45] Date of Patent: Feb. 9, 1999

[54] IMAGE PROCESSING APPARATUS USING ERROR DIFFUSION TECHNIQUE

[75] Inventor: Hideo Kumashiro, Toyokawa, Japan

[73] Assignee: Minolta Co., Ltd., Japan

[21] Appl. No.: 545,412

[22] Filed: Oct. 19, 1995

[30] Foreign Application Priority Data

| Oct. 20, 1994 | [JP] | Japan | 6-255220 |
| Oct. 26, 1994 | [JP] | Japan | 6-262700 |
| Oct. 28, 1994 | [JP] | Japan | 6-265284 |
| Aug. 23, 1995 | [JP] | Japan | 7-214504 |
| Aug. 23, 1995 | [JP] | Japan | 7-239103 |

[51] Int. Cl.$^6$ .................................. G06K 9/36
[52] U.S. Cl. ........................... 382/252; 358/465
[58] Field of Search .................. 382/252, 274; 358/465, 466, 456, 458

[56] References Cited

U.S. PATENT DOCUMENTS

| 5,050,000 | 9/1991 | Ng | 358/298 |
| 5,153,925 | 10/1992 | Tanioka et al. | 382/272 |
| 5,204,760 | 4/1993 | Murayama et al. | 358/456 |
| 5,208,684 | 5/1993 | Itoh | 358/456 |
| 5,351,137 | 9/1994 | Kato et al. | 358/456 |
| 5,438,634 | 8/1995 | Kumagai | 358/465 |
| 5,454,052 | 9/1995 | Kojima | 382/233 |
| 5,515,180 | 5/1996 | Maeda et al. | 358/458 |
| 5,543,855 | 8/1996 | Yamada et al. | 358/445 |
| 5,553,166 | 9/1996 | Kakutani | 382/252 |
| 5,600,764 | 2/1997 | Kakutani | 395/131 |

FOREIGN PATENT DOCUMENTS

| 63-155956 | 6/1988 | Japan . |
| 1-270456 | 10/1989 | Japan . |
| 4-219071 | 8/1992 | Japan . |
| 6-98157 | 4/1994 | Japan . |

Primary Examiner—Yon J. Couso
Attorney, Agent, or Firm—Burns, Doane, Swecker & Mathis, L.L.P.

[57] ABSTRACT

An 8-bit input image data value has its range adjusted by an image range conversion lookup table and is converted into a 4-bit dither image data value f2 with a multi-value dither circuit. The converted 4-bit dither image data value f2 is error-corrected by an error correction unit, and then binarized with a predetermined binarization threshold value of Th=8. An error between binarized data value g and error-correction image data value f2' is calculated by the error calculation unit to be stored in an error storage line memory. Error data e' is provided with respect to a pixel of interest by a peripheral error weighting filter, whereby error is propagated to peripheral pixels of the pixel of interest. As a result, an image processing apparatus of high picture quality, high speed, and low cost is provided.

30 Claims, 45 Drawing Sheets

FIG. 2
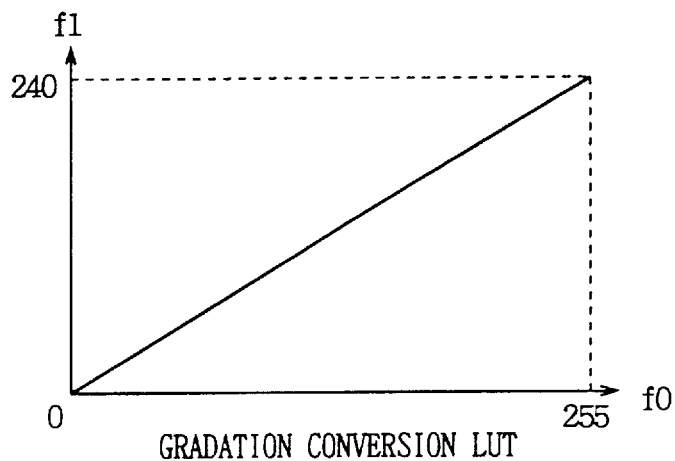
GRADATION CONVERSION LUT
FIG. 3
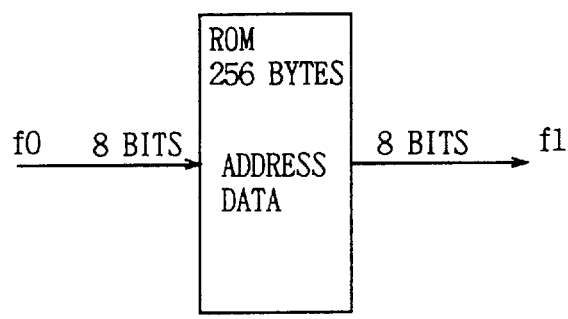
FIG. 4
```
FOR    N=0   TO   14
IF     N×16≦f1(x,y)<(N+1)×16
THEN
       IF     f1 (x,y)  >N×16+Txy
       THEN   f2 (x,y)  =N+1
       ELSE   f2 (x,y)  =N
NEXT   N                           (3)
```

FIG. 6

| f1 | REGION N |
|---|---|
| 240 | |
| | 14 |
| 224 | |
| | 13 |
| 208 | |
| | 12 |
| 192 | |
| | 11 |
| 176 | |
| | 10 |
| 160 | |
| | 9 |
| 144 | |
| | 8 |
| 128 | |
| | 7 |
| 112 | |
| | 6 |
| 96 | |
| | 5 |
| 80 | |
| | 4 |
| 64 | |
| | 3 |
| 48 | |
| | 2 |
| 32 | |
| | N = 1 |
| 16 | |
| | N = 0 |
| 0 | |

FIG. 7a

| 6 | 7 | 8 | 9 |
|---|---|---|---|
| 5 | 0 | 1 | 10 |
| 4 | 3 | 2 | 11 |
| 15 | 14 | 13 | 12 |

Txy : 4×4

SPIRAL TYPE DITHER PATTERN

| 0 | 0 | 0 | 0 |
|---|---|---|---|
| 0 | 0 | 0 | 0 |
| 0 | 0 | 0 | 0 |
| 0 | 0 | 0 | 0 |

2

| 0 | 0 | 0 | 0 |
|---|---|---|---|
| 0 | 1 | 1 | 0 |
| 0 | 0 | 0 | 0 |
| 0 | 0 | 0 | 0 |

4

| 0 | 0 | 0 | 0 |
|---|---|---|---|
| 0 | 1 | 1 | 0 |
| 0 | 1 | 1 | 0 |
| 0 | 0 | 0 | 0 |

15

| 1 | 1 | 1 | 1 |
|---|---|---|---|
| 1 | 1 | 1 | 1 |
| 1 | 1 | 1 | 1 |
| 0 | 1 | 1 | 1 |

16

| 1 | 1 | 1 | 1 |
|---|---|---|---|
| 1 | 1 | 1 | 1 |
| 1 | 1 | 1 | 1 |
| 1 | 1 | 1 | 1 |

22

| 1 | 1 | 1 | 1 |
|---|---|---|---|
| 2 | 2 | 2 | 1 |
| 2 | 2 | 2 | 1 |
| 1 | 1 | 1 | 1 |

24

| 2 | 2 | 1 | 1 |
|---|---|---|---|
| 2 | 2 | 2 | 1 |
| 2 | 2 | 2 | 1 |
| 1 | 1 | 1 | 1 |

31

| 2 | 2 | 2 | 2 |
|---|---|---|---|
| 2 | 2 | 2 | 2 |
| 2 | 2 | 2 | 2 |
| 1 | 2 | 2 | 2 |

224

| 14 | 14 | 14 | 14 |
|---|---|---|---|
| 14 | 14 | 14 | 14 |
| 14 | 14 | 14 | 14 |
| 14 | 14 | 14 | 14 |

233

| 15 | 15 | 15 | 15 |
|---|---|---|---|
| 15 | 15 | 15 | 14 |
| 15 | 15 | 15 | 14 |
| 14 | 14 | 14 | 14 |

235

| 15 | 15 | 15 | 15 |
|---|---|---|---|
| 15 | 15 | 15 | 15 |
| 15 | 15 | 15 | 15 |
| 14 | 14 | 14 | 14 |

239

| 15 | 15 | 15 | 15 |
|---|---|---|---|
| 15 | 15 | 15 | 15 |
| 15 | 15 | 15 | 15 |
| 14 | 15 | 15 | 15 |

240

| 15 | 15 | 15 | 15 |
|---|---|---|---|
| 15 | 15 | 15 | 15 |
| 15 | 15 | 15 | 15 |
| 15 | 15 | 15 | 15 |

DECODER A TABLE (SPIRAL TYPE)

| HORIZONTAL SYNCHRONIZATION COUNTER | | VERTICAL SYNCHRONIZATION COUNTER | | DECODER A (Txy) OUTPUT |
|---|---|---|---|---|
| Q0 | Q1 | Q0 | Q1 | |
| 0 | 0 | 0 | 0 | 6 |
| 1 | 0 | 0 | 0 | 7 |
| 0 | 1 | 0 | 0 | 8 |
| 1 | 1 | 0 | 0 | 9 |
| 0 | 0 | 1 | 0 | 5 |
| 1 | 0 | 1 | 0 | 0 |
| 0 | 1 | 1 | 0 | 1 |
| 1 | 1 | 1 | 0 | 10 |
| 0 | 0 | 0 | 1 | 4 |
| 1 | 0 | 0 | 1 | 3 |
| 0 | 1 | 0 | 1 | 2 |
| 1 | 1 | 0 | 1 | 11 |
| 0 | 0 | 1 | 1 | 15 |
| 1 | 0 | 1 | 1 | 14 |
| 0 | 1 | 1 | 1 | 13 |
| 1 | 1 | 1 | 1 | 12 |

| MORE SIGNIFICANT 4 BITS | BINARIZATION RESULT | DECODER B OUTPUT |
|---|---|---|
| 0 | 0 | 0 |
| 0 | 1 | 1 |
| 1 | 0 | 1 |
| 1 | 1 | 2 |
| 2 | 0 | 2 |
| 2 | 1 | 3 |
| 3 | 0 | 3 |
| 3 | 1 | 4 |
| (OMITTED) | | |
| D(13) | 0 | 13 |
| D(13) | 1 | 14 |
| E(14) | 0 | 14 |
| E(14) | 1 | 15 |
| F(15) | 0 | 15 |
| F(15) | | |

FIG. 12a
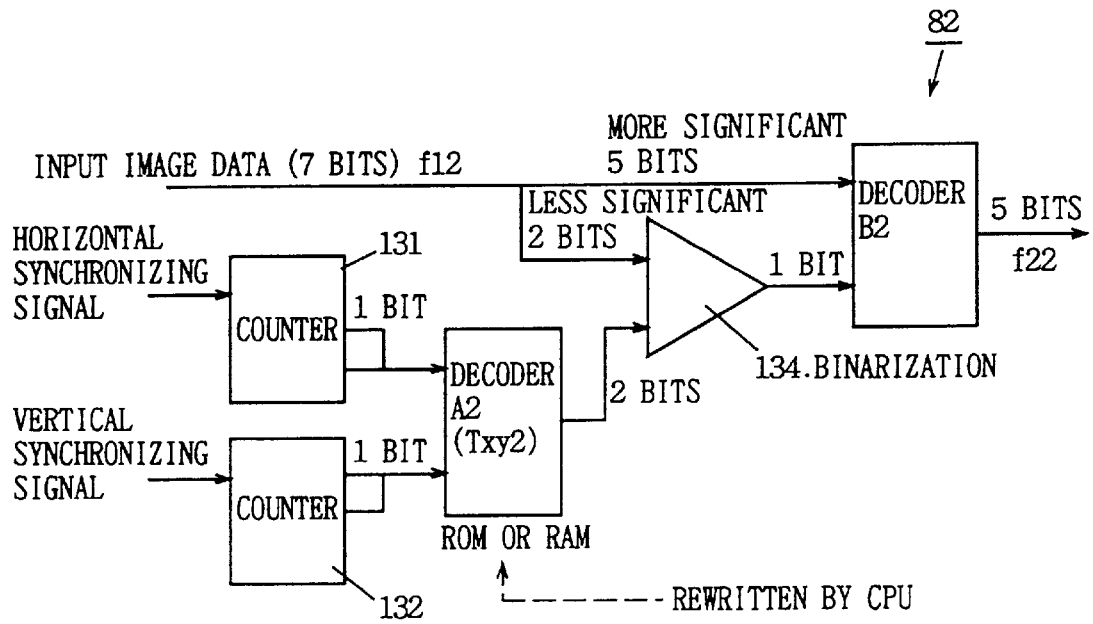
FIG. 12b
Txy
| 0 | 1 |
|---|---|
| 3 | 2 |
FIG. 13
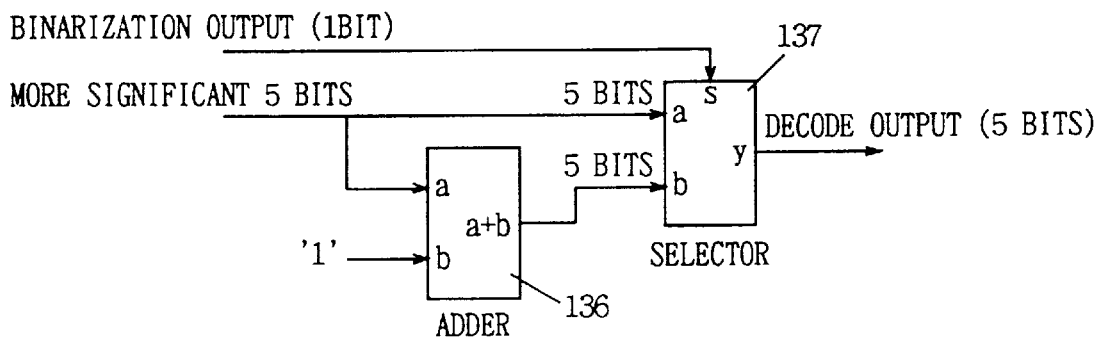

FIG. 16

| r(i,j)= | | 1 | 3 | 1 | | i -2 |
|---|---|---|---|---|---|---|
| | 1 | 3 | 5 | 3 | 1 | -1 |
| | 3 | 5 | * | | | 0 |
| j: | -2 | -1 | 0 | +1 | +2 | |

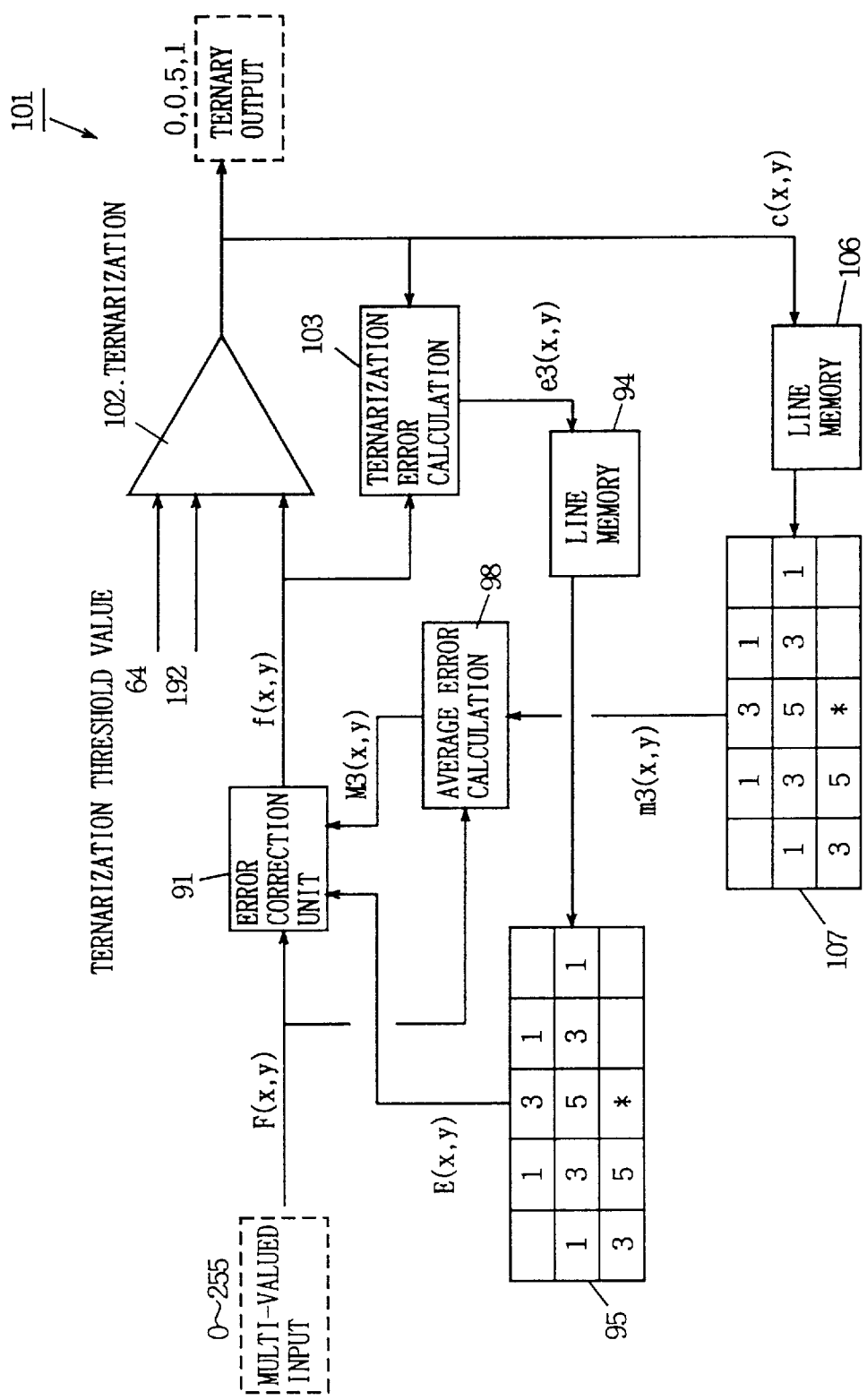
F I G. 19

FIG. 27a    PRIOR ART
 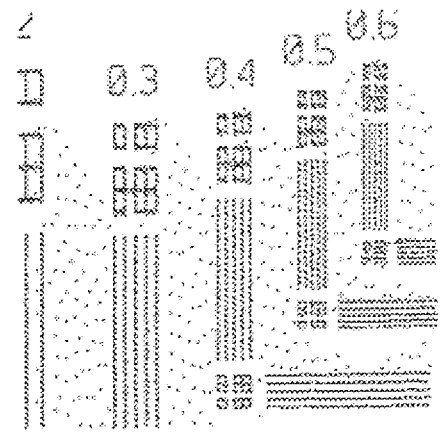
FIG. 27b    PRIOR ART
 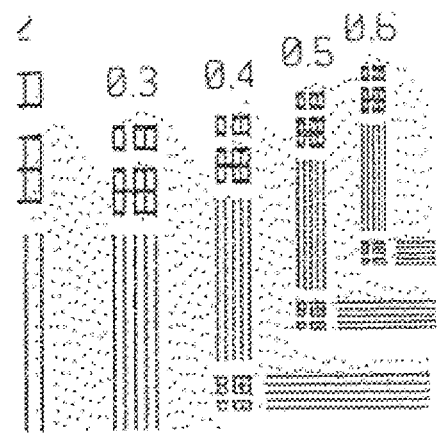
FIG. 27c    PRIOR ART
 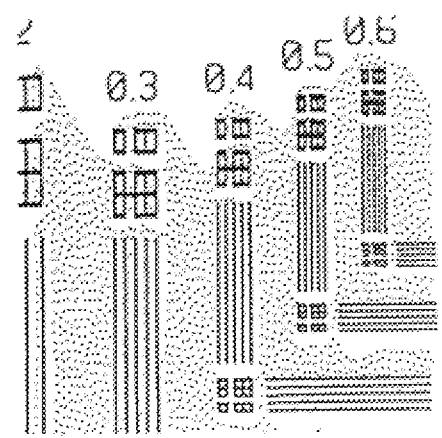

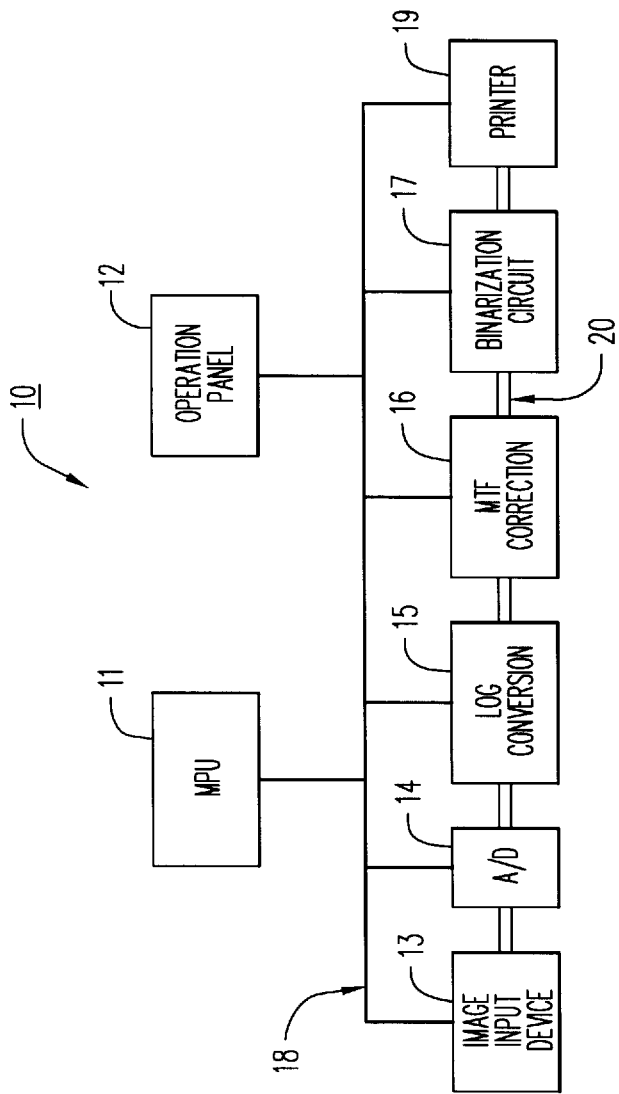

FIG. 35a
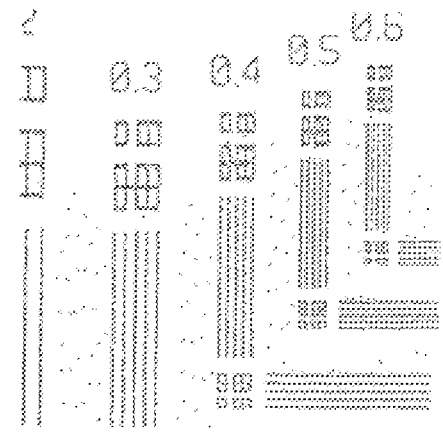
FIG. 35b
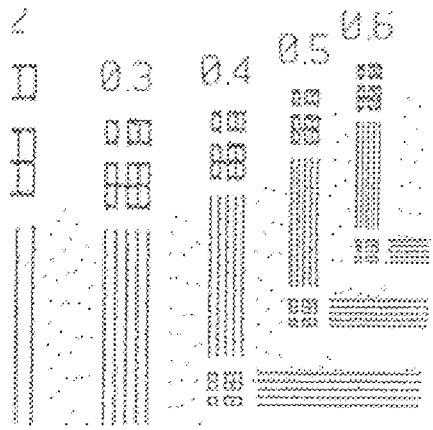
FIG. 35c
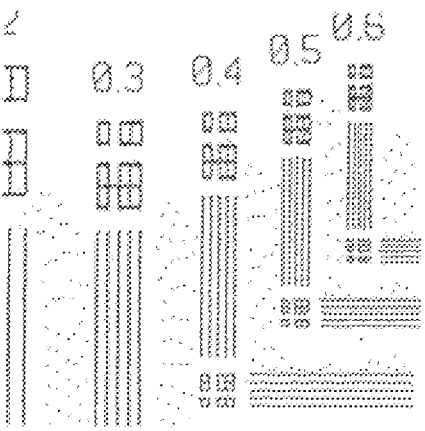

FIG. 39a
 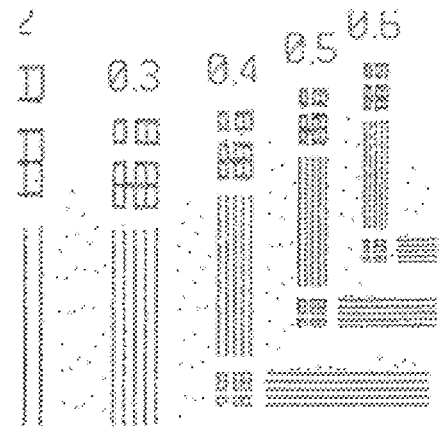
FIG. 39b
 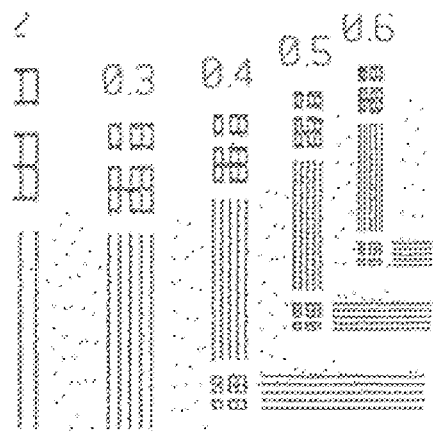
FIG. 39c
 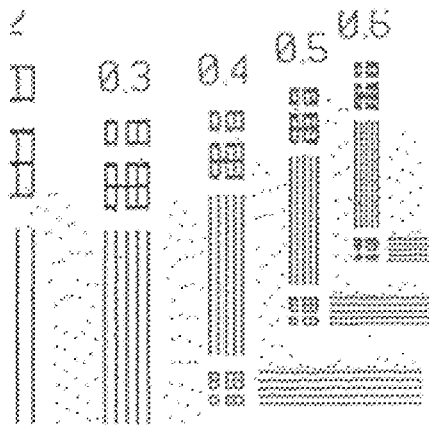

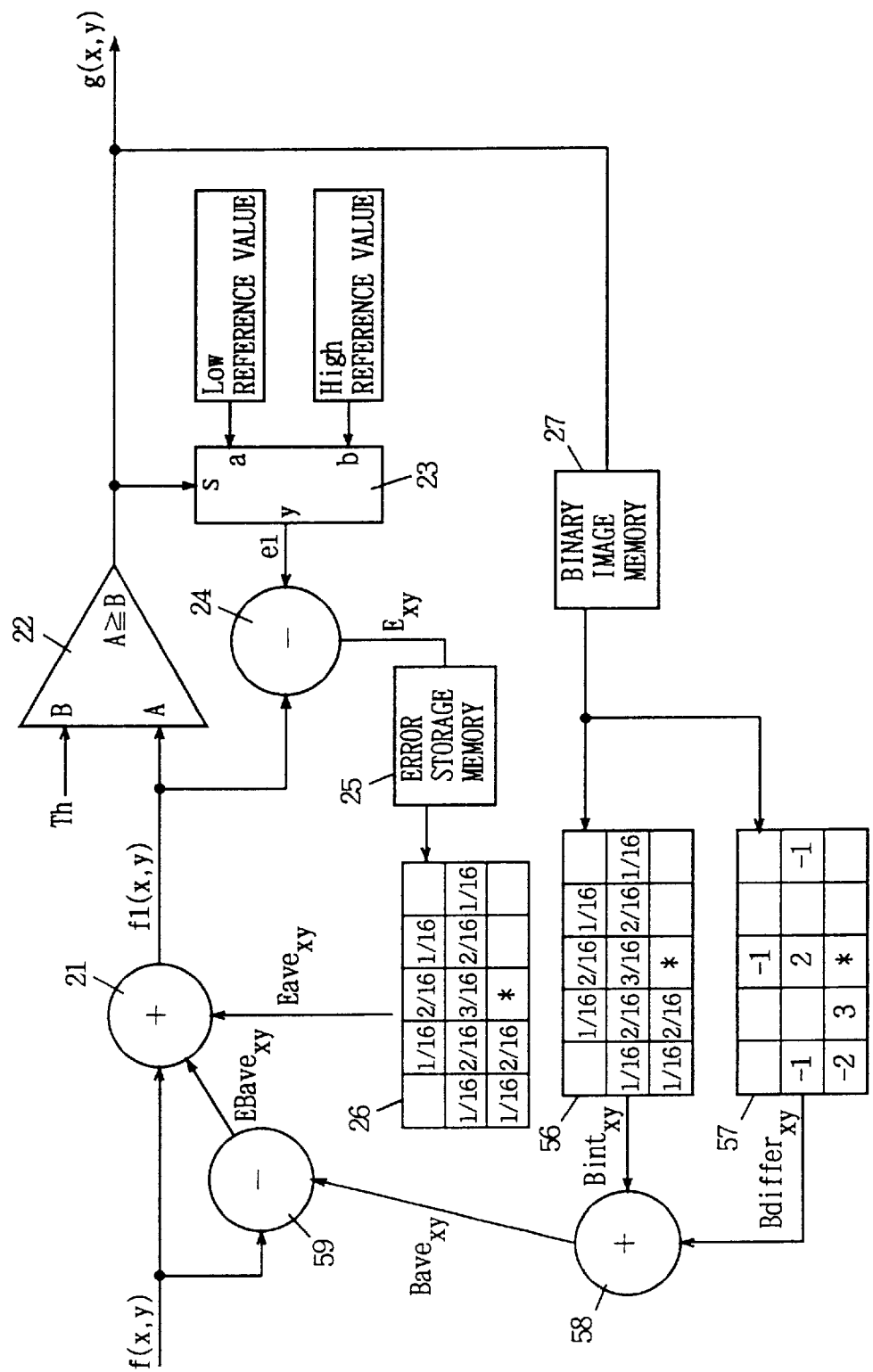
F I G. 48

| (i,j)= | | 1/16 | 2/16 | 1/16 | | i: -2 |
| --- | --- | --- | --- | --- | --- | --- |
| (1) | 1/16 | 2/16 | 3/16 | 2/16 | 1/16 | -1 |
| | 1/16 | 2/16 | * | | | 0 |
| j: | -2 | -1 | 0 | +1 | +2 | |

IMAGE PROCESSING APPARATUS USING ERROR DIFFUSION TECHNIQUE

BACKGROUND OF THE INVENTION

1. Field of the Invention

The present invention relates to image processing apparatuses, and more particularly, to an image processing apparatus using the error diffusion method.

2. Description of the Background Art

The error diffusion technique is conventionally known as the binarization method of furnishing both the gradation and resolution in an image processing apparatus. According to the error diffusion binarization technique, an error-corrected multi-valued pixel of 8 bits, for example, is binarized with the threshold value of Th=128. A binarization error is generated thereby, which is propagated to another pixel to preserve area gradation. A pseudo gradation representation of a conventional error diffusion technique will be described hereinafter.

FIG. 51 is a block diagram of an error diffusion unit 150 employed in a conventional image processing apparatus. Referring to FIG. 51, error diffusion unit 150 includes an error correction unit 151 for correcting a multi-valued pixel data f (x, y) represented by 8 bits per pixel (gradation of 256 levels), for example, according to error data e' (x, y) that will be described afterwards, a binarization unit 152 for binarizing error-corrected image data f' (x, y) with a predetermined binarized threshold value of Th=128, an error calculation unit 153 for calculating the error of binarized binary data g (x, y) and error corrected image data f' (x, y), an error storage line memory 154 for storing three lines of the calculated error, and a peripheral error weighting filter 155 connected to error storage line memory 154 for applying the weight of peripheral pixels to a pixel of interest.

Here, x, y are variables indicating the address of a pixel of image data, where the value of x indicates an address in the subscanning direction and the value of y indicates an address in the main scanning direction. Therefore, f (x, y) indicates a value of the image data of a pixel of address (x, y).

The operation of error diffusion unit 150 will be described hereinafter. Error correction unit 151 provides image data f' (x, y) that is error-corrected with error data e' (x, y) to binarization unit 152. Image data f' (x, y) is binarized by a fixed binary threshold value of Th=128 to result in binary data g (x, y) of either 0 or 1. Error calculation unit 153 provides a binarized error e (x, y) which is calculated as set forth in the following.

(i) When error-corrected image data f' (x, y) ≧ binarized threshold value Th (128):
Binary data g (x, y)=1 (black)
Error e (x, y)=f' (x, y)−255
(ii) Otherwise:
Binary data g (x, y)=0 (white)
Error e (x, y)=f' (x, y)−0

Three lines of error e (x, y) calculated as above are stored by error storage line memory 154. Using peripheral error weighting filter 155, a weight average error data e' (x, y) for diffusing error e (x, y) to another pixel is calculated. Weight coefficient k (i, j) is greater as a function of a closer location to the pixel of interest, and has a total sum of 1. Weight coefficient k (i, j) is shown in FIG. 52.

FIG. 53 shows binarization error e (x, y). When error correction data f' (x, y) is greater than the threshold value of Th=128 (indicated by f1 (x, y) in FIG. 53), binarization error e (x, y) is represented as a minus error as shown in e1 (x, y) in FIG. 53. When error correction data f' (x, y) is smaller than the binarization threshold value of Th=128 (indicated by f2 (x, y) in FIG. 53), binarization error e (x, y) is represented as a plus error as shown in e2 (x, y).

Weight average error data e' (x, y) is calculated by the following equation (1).

$$e'(x,y) = \sum_{i=-2}^{2} \sum_{j=-2}^{0} e(x+i, y+j) \times x(i,j) \tag{1}$$

The calculated error data e' (x, y) is provided to error correction unit 151, whereby error is sequentially propagated.

According to the error diffusion technique of a conventional image processing apparatus, a particular stripe pattern is generated in the binarization pattern in images such as computer graphics and photographs that have very extremely small dispersion of pixels since the generation of a similar error is repeated periodically. An example of a binarization pattern when an original image of a picture with a dispersion of 0 (high frequency component of 0 with only DC component) is shown in FIG. 54. The continuous streak of pixels in a diagonal direction shown in FIG. 54 is the above-mentioned stripe pattern. Since a conventional error diffusion unit includes a feedback loop as shown in FIG. 51, high speed operation is more difficult to implement than a dither process. There is also a problem that the circuit complexity is increased more than a dither process since an error storage line memory is required.

In an image of an original such as a document written by a pencil which includes a low density thin stroke of an original density (OD)=0.4 (32~64/255 gradation levels in density data value) with a line width of 125 microns (approximately several dots in 400 dpi) on a white base (0/255 gradation level in density data value), the thin stroke segment has an intermittent appearance since error propagation is too slow according to the conventional error diffusion technique. This problem will be described in detail hereinafter.

FIG. 55a shows multi-valued image f (x, y) applied to error correction unit 151, and FIG. 55b shows error data e' (x, y). Attention is focused on image data f (x, y) suddenly switched to a low density thin stroke (density data value of 32) from a white base (density data value of 0). Image data f (x, y) of the pixel of interest is 32, whereas image data f (x, y) of the pixels preceding the pixel of interest is a white base (density data value of 0). Error e' (x, y) which is to be corrected on the basis of image data f (x, y) of the pixel of interest is 0. Therefore, error propagation for representing low density thin stroke region f (x, y) in a pseudo gradation is initiated with error data e' (x+1, y) as the origin (end). However, binarization error e' (x, y) of low density thin stroke f (x, y) takes a small value of +32. Therefore, a propagation distance of several dots in both the x axis direction and the y axis direction is required to reach the binarization threshold value of Th128 to have a black dot recorded.

More specifically, error correction data f' (x, y) in the case where the pixel abruptly changes from a white base to a low density thin stroke is represented by the following equation.

$$f'(x, y)=f(x, y)+e'(x, y)=32+0=32$$

When the width of the low density thin stroke region is only several dots, this error propagation will not be in time to record a black dot. As a result, the thin stroke is shown in an intermittent manner. FIG. 56 shows samples of printed characters of several sizes by a conventional image processing apparatus. Referring to the sample of size 10.5, it is appreciated that the left side portion of a thin stroke is missing in the horizontal line direction.

Thus, in an image processing apparatus employing a conventional error calculation unit 150, there was a problem that a thin stroke segment has an intermittent appearance when the width of the low density thin stroke portion is only several dots.

SUMMARY OF THE INVENTION

In view of the foregoing, an object of the present invention is to provide an image processing apparatus of high picture quality, high speed, and low cost.

Another object of the present invention is to provide an image processing apparatus having a high rendition of a low density thin stroke.

A further object of the present invention is to provide an image processing apparatus that can have generation of unique stripe artifacts suppressed in image data of low dispersion such as a computer graphics image.

A still further object of the present invention is to provide an image processing apparatus from which a desired image is obtained that allows nonlinear gamma correction easily and at low cost.

A still further object of the present invention is to provide an image processing apparatus that allows high definition conversion of the number of gradation levels by an error diffusion technique.

The above objects of the present invention can be achieved by providing a conversion unit for converting input image data of L gradation levels into image data of M gradation level where M is smaller than L in an image processing apparatus.

Since input image data represented by gradation L is converted into image data of gradation M smaller than gradation L by a conversion unit, and the converted image data of gradation M is error-diffused to be converted into image data of gradation N where N is smaller than M, the basic operation data width requires only M gradation levels which is less than L gradation levels. Also, a process incorporating the advantages of both the dither conversion technique and the error diffusion technique can be carried out.

Generation of a stripe pattern inherent to the error diffusion process caused by a dither unit is suppressed to improve the picture quality. Furthermore, the calculation accuracy of an error calculation feedback loop can be reduced to approximately half of the conventional case by reducing the number of bits. Since the memory for storing error can be reduced to approximately half of that of a conventional one, an image processing apparatus of high quality, high speed, and low cost is provided.

According to another aspect of the present invention, M-ary input image data of a pixel of interest is converted into data of N-ary bits. An average value of a plurality of N-ary image data is calculated. Average error data for N-ary conversion is calculated on the basis of input image data and the average value. This average error data is fed back to the input image data.

The input M-ary image data is corrected by feeding back N-ary average error data in converting the M-ary image data into N-ary image data. When error diffusion according to the N-ary error data is not sufficient, error diffusion is carried out using the N-ary average error data. Therefore, when there is a thin stroke of a small value sufficiently smaller than the N-ary threshold value on the base and error diffusion according to the error data is not sufficient, the N-ary average error data is also used in the error diffusion process.

As a result, rendition of a low density thin stroke can be improved in an image processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows an image range conversion lookup table.

FIG. 3 shows an ROM storing the image range conversion look-up table.

FIG. 4 is a diagram for describing the algorithm of converting 8-bit data into 4-bit data.

FIG. 6 shows the division of data of 8 bits into regions partioned into 15 areas.

FIGS. 7a and 7b show examples of conversion of a multi-valued dither image.

FIGS. 12a and 12b are block diagrams showing a multi-value dither circuit according to a second embodiment.

FIG. 13 is a block diagram of decoder B of the second embodiment.

FIG. 16 shows weighing coefficients of a binarization average calculation filter.

FIG. 18 is a diagram for describing the effect of the percent invention.

FIG. 19 is a block diagram showing an error calculation unit according to a fourth embodiment.

FIGS. 27a, 27b, and 27c show images subjected to a gamma correction according to a conventional method.

FIG. 30 is a block diagram showing a structure of an image processing apparatus according to a sixth embodiment.

FIGS. 35a, 35b and 35c show effects of the sixth embodiment.

FIGS. 39a, 39b and 39c show effects of the seventh embodiment.

FIG. 48 is a block diagram of an image binarization device according to a twelfth embodiment of the present invention.

FIG. 56 is a diagram for describing problems in a conventional image processing apparatus.

DESCRIPTION OF THE PREFERRED EMBODIMENTS

FIRST EMBODIMENT

Figure 1:
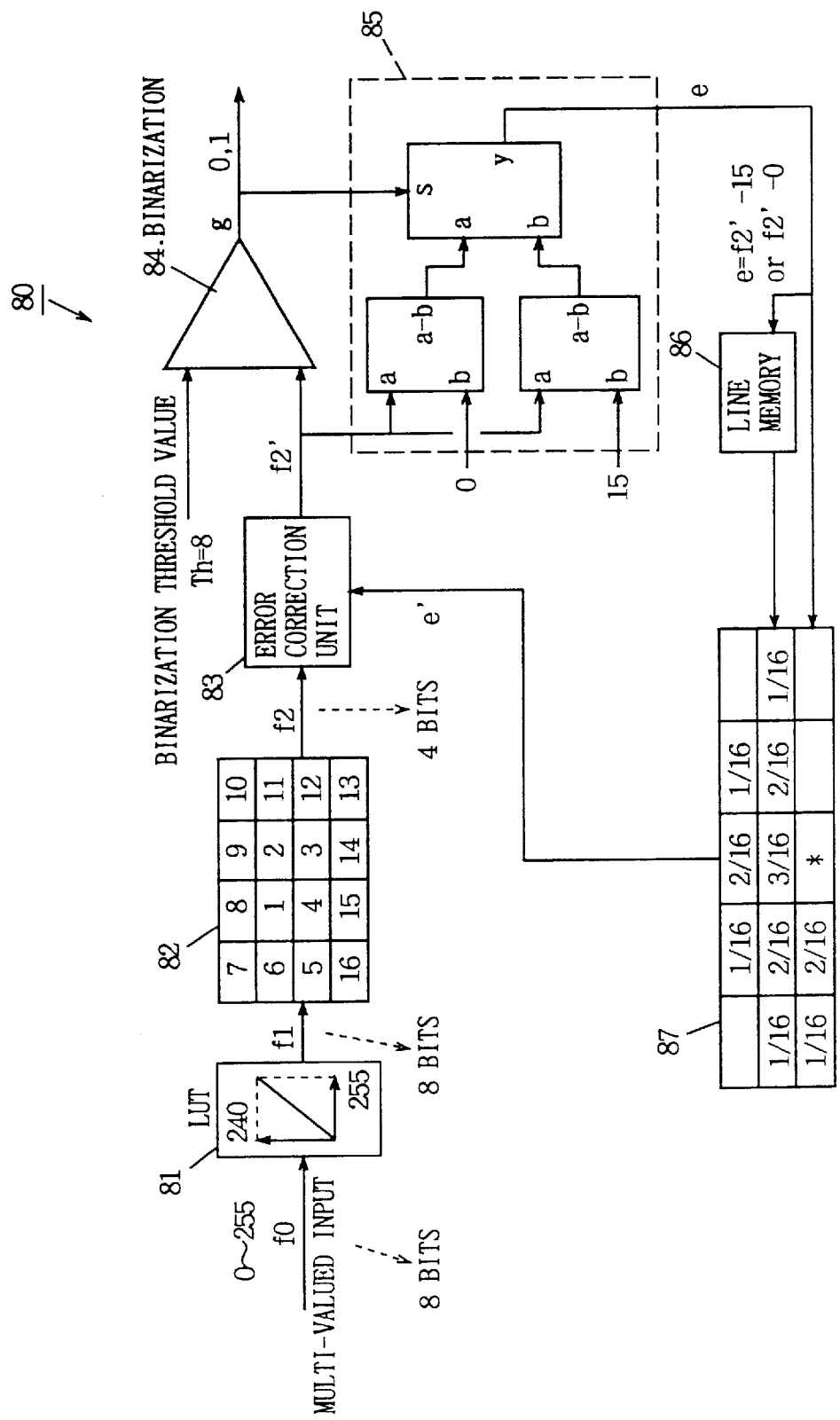
FIG. 1 is a block diagram showing a dither error diffusion circuit of an image processing apparatus according to the present invention.

In a first embodiment of the present invention, an input image data of 8 bits and 256 gradation levels is converted into an image data of 4 bits of 241 gradation levels by a dither process using a 4×4 matrix, followed by conversion into a 1-bit pseudo gradation binary image by an error diffusion binarization method. FIG. 1 is a block diagram showing the entire structure of a dither error diffusion circuit 80 forming an image processing apparatus according to the first embodiment of the present invention.

Referring to FIG. 1, dither error diffusion circuit 80 includes an image range conversion lookup table 81 to which image data f0 (x, y) of 8 bits, for example, is entered, a multi-value dither unit 82 for dither-processing image data f1 (x, y) converted by image range conversion lookup table 81 into image data of 4 bits, an error correction unit 83 for carrying out error-correction on image data f2 (x, y) of 4 bits from multi-value dither unit 82, a binarization unit 84 for binarizing error-corrected image data f2' (x, y) with a predetermined threshold value of Th=8, an error calculation unit 85 for calculating error of binarized image data g (x, y) and error-corrected image data f2' (x, y), an error storage line memory 86 for storing three lines of binarized error e (x, y) calculated by error calculation unit 15, and a peripheral error weighting filter 87 connected to error storage line memory 86 for providing error correction data e' (x, y) for error correction.

The operation thereof will be described hereinafter. The input multi-valued image f0 (x, y) is an image of 8 bits and of 256 graduation levels. The gradation includes the level of 0–255. The input image data f0 (x, y) is first converted into image data f1 (x, y) by image range conversion lookup table 81. This converted image data f1 (x, y) is a 8-bit data of 241 gradation levels (0–240). This value of gradation level conversion is selected since only 240 levels can be represented by the operation of:

15(4 bits)×4×4(number of matrices)=240 with a 4-bit (0~15), 4×4 multi-valued dither in a conversion using a 4×4 matrix of the dither process.

The 256 gradation levels (0~255) of the 8-bit data is rounded into 241 gradation levels (0~240).

FIG. 2 schematically shows image range conversion lookup table 81. Referring to FIG. 2, an input multi-valued image data f0 (x, y) having 256 gradation levels of 0~255 is converted into image data f1 (x, y) having 241 gradation levels of 0~240. This gradation level conversion is obtained by the following equation (2).

$$f1(x, y) = (240/255) \times f0(x, y) \qquad (2)$$

This conversion table is stored in the ROM shown in FIG. 3. Input data f0 (x, y) of 8 bits is converted into image data f1 (x, y) of the same 8 bits.

Figure 5:
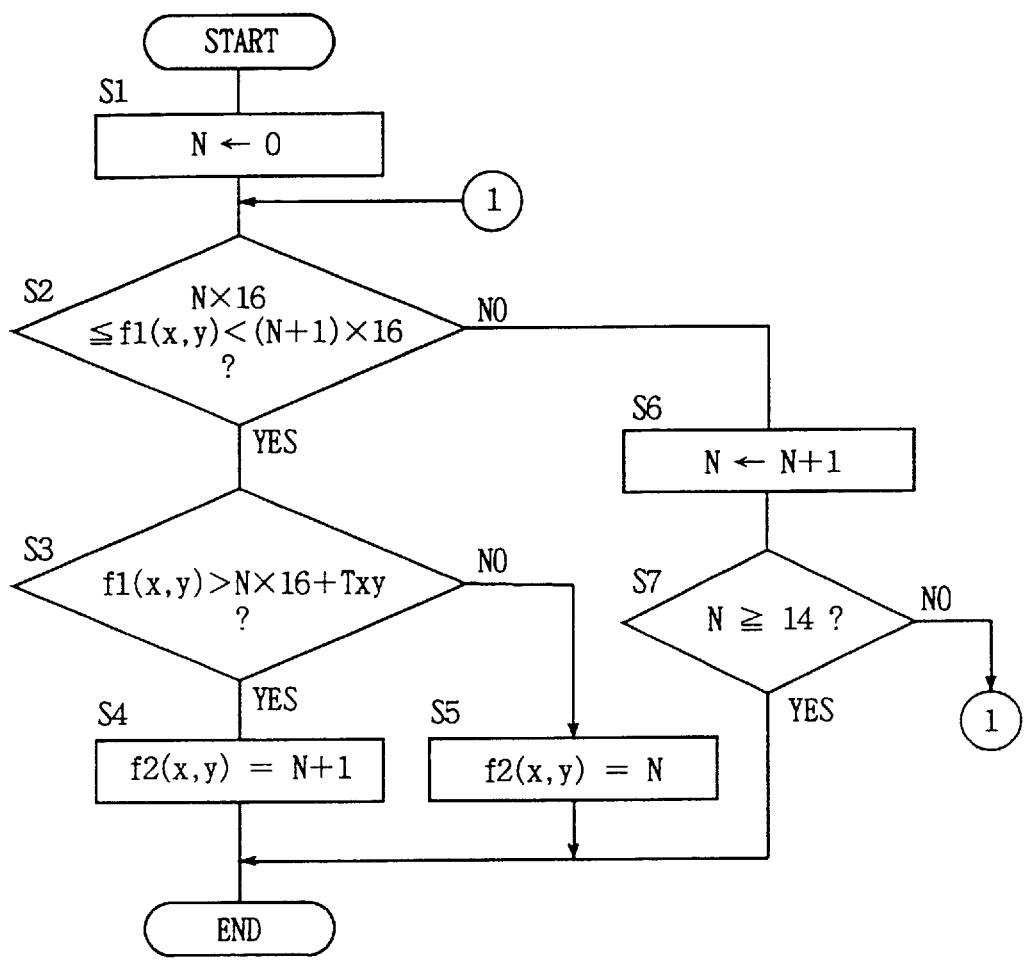
FIG. 5 is a flow chart showing the processing contents carried out by a multi-value dither circuit.

Multi-value dither unit 82 will be described hereinafter. Multi-value dither unit 82 converts the input image data f1 (x, y) into multi-valued dither image f2 (x, y). Image data f2 (x, y) is image data of 241 gradation levels by a 4×4 matrix of 4 bits (0~15). An algorithm (equation (3)) and a flow chart of this conversion are shown in FIGS. 4 and 5, respectively.

In multi-value dither unit 82, output image data f2 (x, y) is a 4-bit data (0~15). Input image data f1 of 8 bits (0~240) is divided into 15 sections. Determination is made at respective steps of #1, #2 and #6 of which of the fifteen divided regions (N=0~14) of the 8-bit data belongs. This division is schematically shown in FIG. 6.

When the region (N) of the 8-bit data is identified (YES at step #2), the program proceeds to step #3 where determination is made whether the 8-bit data is greater than the value of the relevant region N multiplied by 16 plus Txy, where Txy is a threshold value calculated according to a prescribed rule. When the 8-bit data is greater than the calculated value (YES at step #3), N+1 is provided as the output of image data f2 (x, y) (#4). Otherwise (NO at step #3), the value of N is directly output as image data f2 (x, y) (#5).

As an example of the above-described threshold value pattern of Txy, FIG. 7a shows a dither pattern using a 4×4 spiral pattern, and FIG. 7b shows conversion thereof. Alternatively, a dot type or Bayer type dither pattern may be used instead of the exhibited spiral type dither pattern.

Conversion of a 8-bit data of "235" will be described with reference to FIGS. 6 and 7a and 7b. 8 bit data f1="235" shows region N=14. Therefore, by comparing N×16+Txy= 14×16+Txy (0~15) and 235 with each Txy at step #3 of FIG. 5, the dither data of "235" shown in FIG. 7b is obtained.

Figures 8, 9:
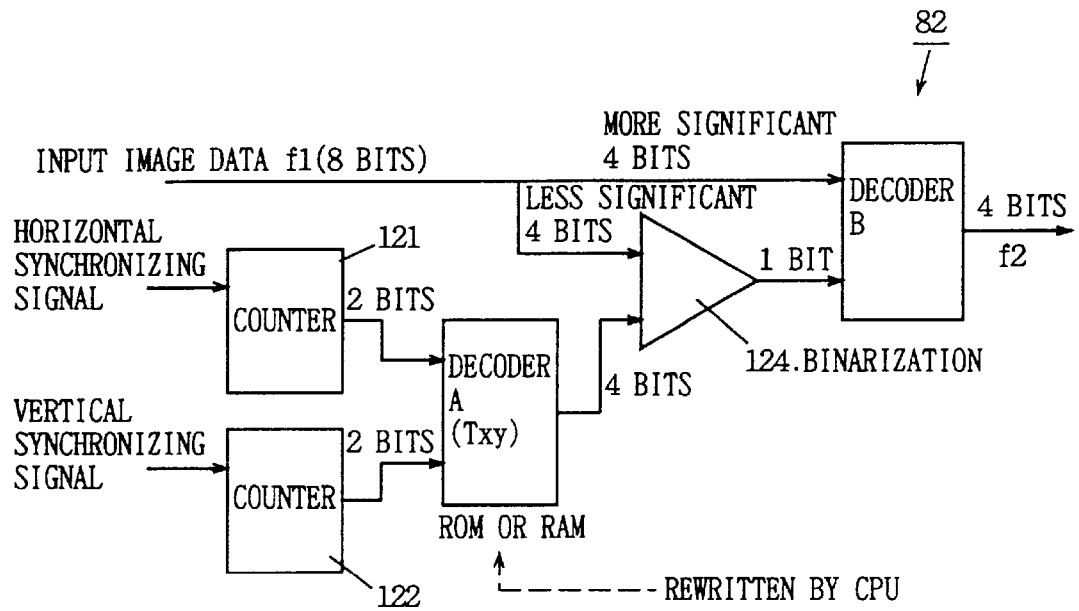
FIG. 8 is a block diagram showing a multi-value dither circuit according to a first embodiment.
FIG. 9 shows a conversion table in a decoder of the first embodiment.

By way of example, a circuit realizing the above-described conversion (equation (3)) will be described with reference to FIG. 8 showing a multi-value dither circuit 82. Referring to FIG. 8, multi-value dither circuit 82 includes counters 121 and 122 for counting horizontal/vertical synchronizing signals in raster scanning carried out by an image readout unit not shown, a decoder A receiving count data of 2 bits from counters 121 and 122 for decoding and providing a 4×4 matrix threshold value Txy (4 bits), a binarization unit 124 for comparing a 4-bit output data from decoder A and the less significant 4 bits of the 8-bit input image data f1 (x, y) for binarization, and a decoder B for decoding the binarized result and the more significant 4 bits of input image data f1 (x, y) to provide output image data f2 (x, y).

FIG. 9 shows a table of decoder A using a spiral dither pattern as the threshold value pattern of decoder A. Referring to FIG. 9, an output is provided from decoder A according to the data of horizontal synchronizing counter and vertical synchronizing counter 121 and 122 of 2 bits. Decoder A can be re-written by a CPU not shown using a SRAM or the like. The threshold value pattern may be changed to a dot type or a Bayer type pattern.

Figures 10, 11:
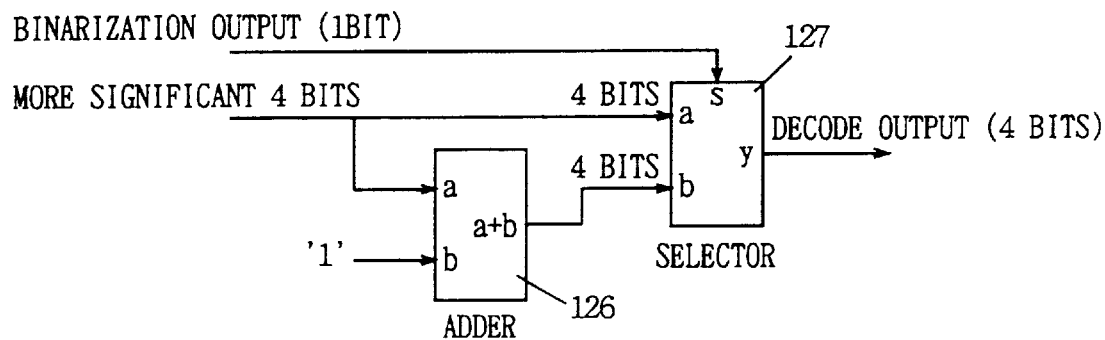
FIG. 10 is a block diagram showing a structure of decoder B of the first embodiment.
FIG. 11 shows a table of decoder B of the first embodiment.

FIG. 10 is a block diagram showing a structure of decoder B. Referring to FIG. 10, decoder B includes an adder 126 for adding 1 to the more significant 4 bits of input image data f1, and a selector 127 for selecting an output of 4 bits from adder 126 or the more significant 4 bits of input image data f1 (x, y) according to a binary output of 1 bit from binarization unit 124. When the input of the 8-bit image data f1 (x, y) towards decoder B is 240 or more (at least F0h in HEX), "carry-out" occurs in adder 126 to result in overflow. The aforementioned image range conversion lookup table 81 is provided to prevent such overflow. Therefore, input image data f1 (x, y) is limited with the range of 0~240 (00h~F0h).

FIG. 11 shows data in the table of decoder B. The 4-bit output of decoder B depends upon the value of the more significant 4 bits of input image data f1 (x, y) and the output from binarization unit 24.

Error calculation unit 85 will be described hereinafter. Error correction unit 83 provides image data f2' (x, y) that is error-corrected with error data e' (x, y). Binarization unit 14 binarizes image data f2' (x, y) with a fixed threshold value of Th=8 to obtain binary data g (x, y). Binary data g (x, y) and error-corrected image data f2' (x, y) are applied to error calculation unit 85 for calculating binarization error. Binarized error e (x, y) is provided by the following equation.

(i) When image data f2' (x, y)≧ binary threshold value Th (8):
Binary data g (x, y)=0 (black)
Binarized error e (x, y)=f2' (x, y)−15
(ii) Otherwise:
Binary data g (x, y)=0 (white)
Binarized error e (x, y)=f2' (x, y)−0

Figure 51:
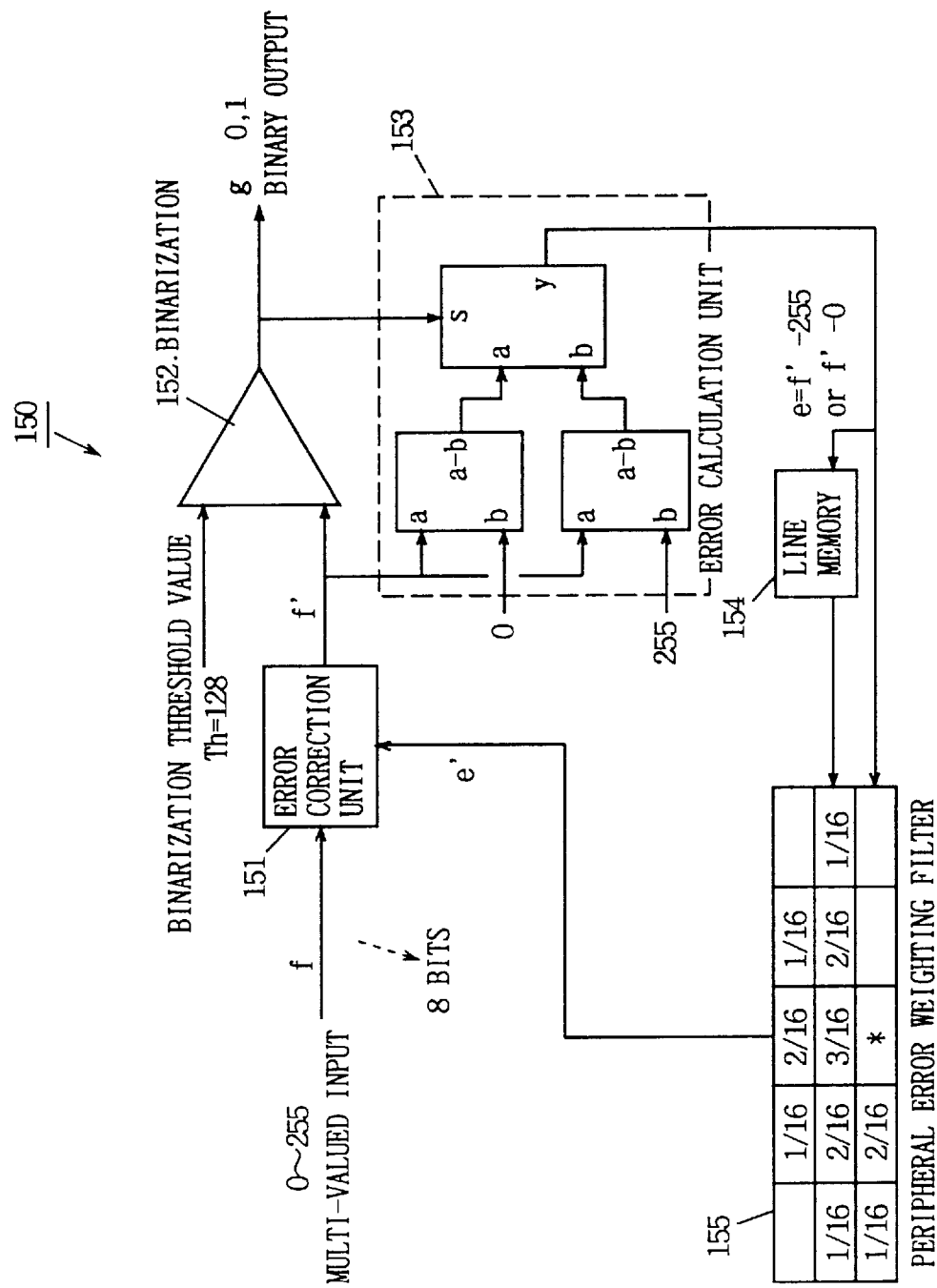
FIG. 51 is a block diagram showing a structure of a conventional error diffusion binarization circuit.
Figures 52, 53:
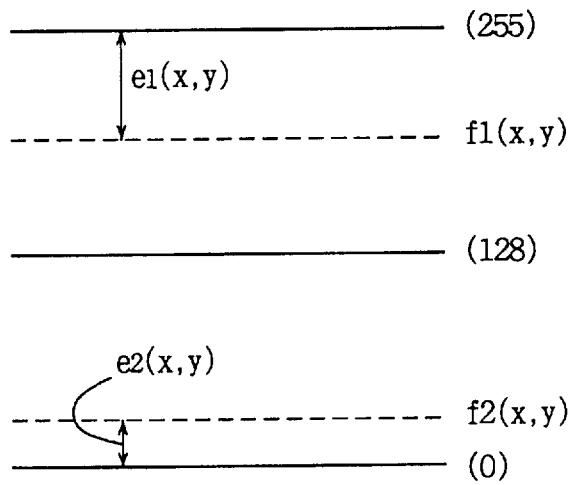
FIG. 52 shows the weight coefficients of a peripheral error weighting filter.
FIG. 53 is a diagram for describing the problems in a conventional error diffusion circuit.
Figure 54:
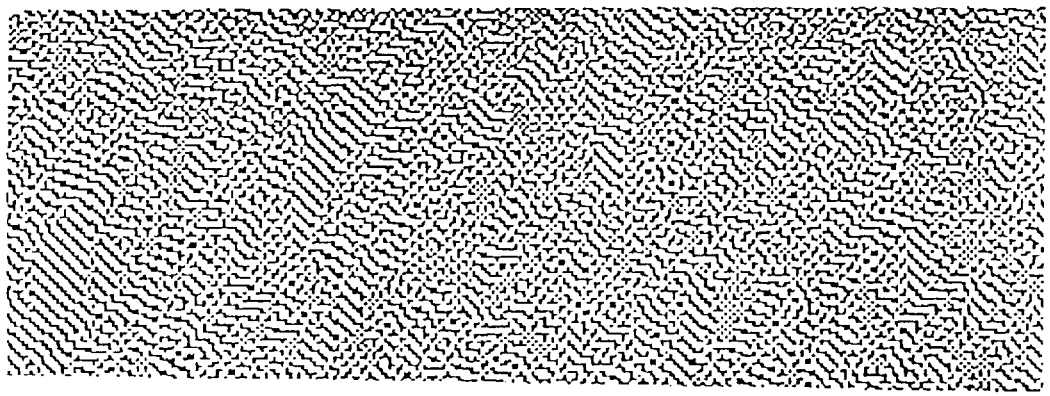
FIG. 54 is a diagram showing binarization error.
Figure 55A:
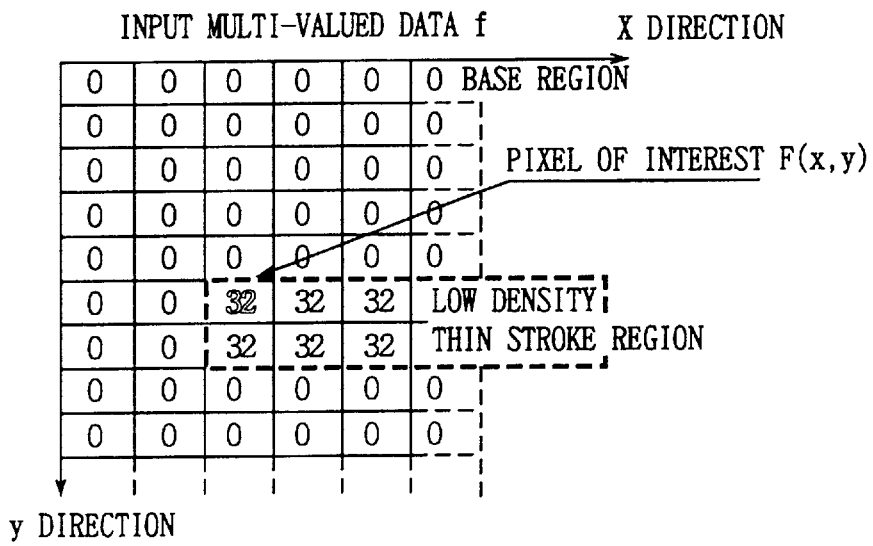
FIGS. 55a and 55b show input multi-valued data applied to a conventional error calculation unit and error data.
Figure 55B:
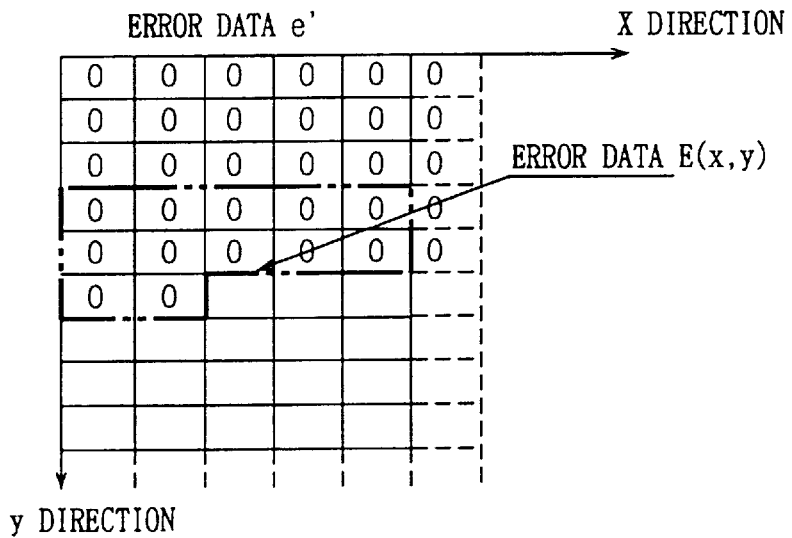

Three lines of error e (x, y) are stored by error storage line memory 16. Weight average error data e' (x, y) for dispersing error e (x, y) to other pixels is provided using peripheral error weighting filter 17. Weighting coefficient k (i, j) becomes greater as a function of a closer location to the pixel of interest, and has a total sum of 1. This error data e' (x, y) is provided to error correction unit 83, whereby error is sequentially propagated. Peripheral error weighting filter 87 for calculating error data e' (x, y) is similar to a conventional one as shown in FIG. 51.

The calculation equation is also similar to the conventional equation of (1).

SECOND EMBODIMENT

In contrast to the first embodiment where image data of 8 bits and 256 gradation levels is used as input image data f1 (x, y) to be converted into image data with a 4×4 matrix, and further converted into a 1-bit pseudo gradation binary image by error diffusion binarization techniques, the second embodiment has input image data of 7 bits and 128 gradation levels converted into image data using a 5×5 matrix, followed by a further conversion by error diffusion binarization techniques. The structure of the second embodiment is basically similar to that of the first embodiment shown in FIG. 1 provided that the structure of multi-value dither unit 82 differs.

The structure thereof will be described hereinafter with reference to FIG. 12a showing a multi-value dither circuit 82. This figure corresponds to FIG. 8 of the first embodiment. Referring to FIG. 12a, multi-value dither circuit 82 includes counters 131 and 132 for receiving horizontal/ vertical synchronizing signals in raster scanning for providing data of 1 bit, a decoder A2 receiving 1-bit data from counters 131 and 132 for providing a 2×2 matrix threshold value Txy (2 bits), a binarization unit 134 for comparing an output of 2 bits from decoder A2 and the less significant 2 bits of input image data f12 (x, y) for binarization, and a decoder B2 for decoding the binarized result of binarization unit 134 and the more significant 5 bits of input image data f12 (x, y) and providing a multi-valued dither output image data f22 (x, y). 2×2 matrix threshold value Txy2 of decoder A is shown in FIG. 12b.

FIG. 13 is a block diagram specifically showing decoder B. Referring to FIG. 13, decoder B includes an adder 136 for adding data 1 to the more significant 5 bits of input image data f12 (x, y), and a selector 137 for selecting an output from adder 136 or the more significant 5 bits of input image data f12 (x, y) according to the binarized output data of 1 bit.

The tables in decoders A2 and B2 are similar to those of the first embodiment, and their description will not be repeated. Although input image data of 7 bits and 8 bits are described in the above embodiments, the present invention is applicable to an input image of a desired bit number according to the picture quality and circuit complexity.

Figure 14:
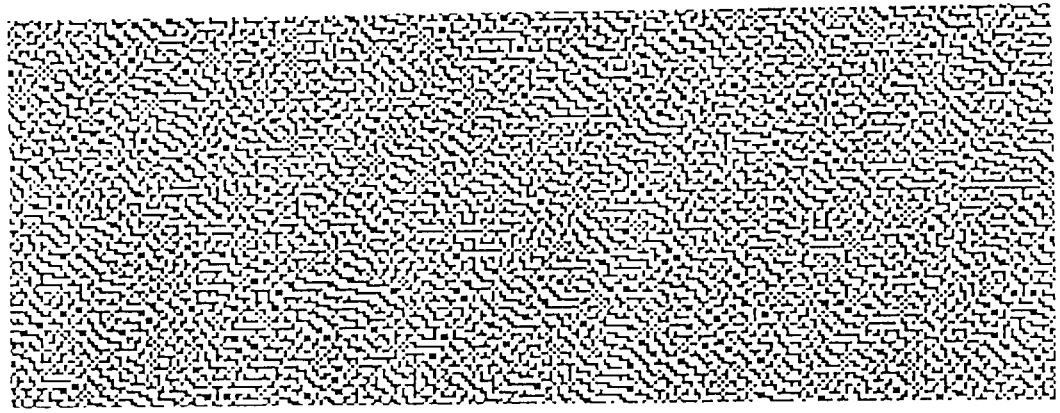
FIG. 14 is a diagram for describing the effect of the first and second embodiments.

The advantage of the present invention will be described hereinafter. By using dither error diffusion circuit 80, an image of low dispersion is subjected to gradation conversion by a multi-value dither technique to have the dispersion increased, and then binarized by an error diffusion method. Therefore, the stripe artifact inherent to a binarization pattern can be suppressed to improve the picture quality. FIG. 14 shows an output image of a binarization pattern from an image processing apparatus employing the dither error diffusion circuit of the present invention. It is appreciated that the continuous streak of artifacts in a diagonal direction is not generated. Furthermore, since an image of 8 bits or 7 bits are subjected to error diffusion binarization after being converted into an image of 4 bits or 5 bits by the multi-value dither unit, the basic number of bits of the error conversion calculation unit may be 4 bits or 5 bits. There is an advantage that an operation can be carried out at a speed higher than the conventional one. The memory required for error calculation may be 4 bits or 5 bits, so that the circuit complexity is reduced to half of a conventional case.

Furthermore, the memory for storing error is reduced in response to the reduced number of bits, so that the cost can be lowered. By implementing the dither error diffusion circuit with a gate array, the number of pin terminals can be reduced to allow reduction of the size of the package.

Since the number of pin terminals when implemented by a gate array is reduced, the consumption power can be suppressed to a low level.

THIRD EMBODIMENT

Figure 15:
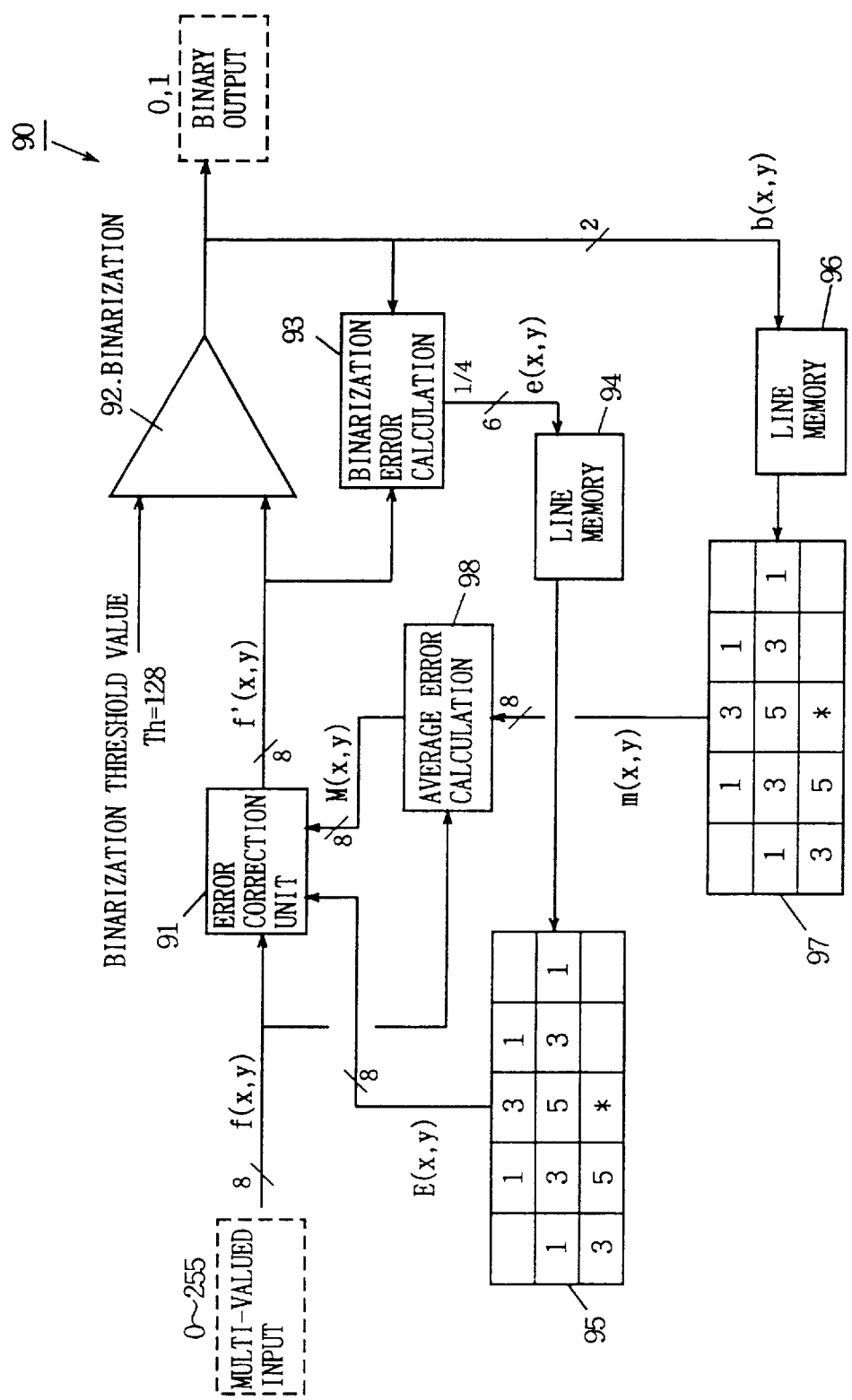
FIG. 15 is a block diagram of an error calculation unit according to a third embodiment of the present invention.

FIG. 15 is a block diagram showing a structure of an error calculation unit 90 incorporated in an image processing apparatus according to a third embodiment of the present invention. Referring to FIG. 15, error calculation unit 90 includes an error correction unit 91 for correcting a multi-valued (for example 256 gradation levels) image data f (x, y) with error data E (x, y) to provide error correction data f' (x, y), a binarization unit 92 for binarizing error correction data f' (x, y) with a predetermined binarization threshold value (for example, 128), a binary error calculation unit 93 for calculating the difference between binary data and error correction data f' (x, y), an error storage line memory 94 for storing the calculated binary error e (x, y), a peripheral error weighting filter 95 for calculating error data E (x, y) for diffusing the binarized error data e (x, y) to other pixels, a binary image line memory 96 for receiving binary output b (x, y) and storing three lines of the binary image data, a binarization average calculation filter 97 for receiving binary image data b (x, y) from binary image line memory 96 for providing binarization average value m (x, y), and an average calculation unit 98 for receiving binarization average value m (x, y) and multi-valued image data f (x, y) to calculate binarization average error M (x, y). Binarization average error M (x, y) is applied to error correction unit 91.

The operation thereof will be described hereinafter. Error correction unit 91 corrects image data f (x, y) of the input multi-value (256 gradation levels) to provide error-corrected error correction data f' (x, y). This value is binarized with a fixed binarization threshold value of Th=128 by binarization unit 92. Binary error calculation unit 93 provides a binarized error e (x, y). Three lines of binarization error e (x, y) are stored by error storage line memory 94. Error E (x, y) for diffusing binarization error e (x, y) to other pixels is calculated using peripheral error weighting filter 95.

Figure 16:
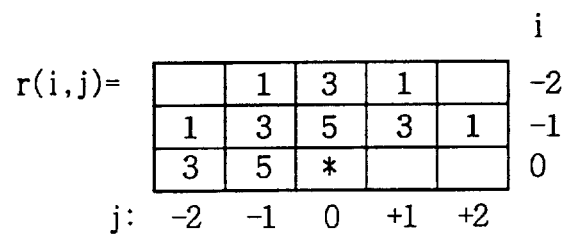

According to error calculation unit 90 of the image processing apparatus of the present invention, three lines of binarization image data b (x, y) are stored in binary image line memory 96. Average value m (x, y) is calculated by binarization average calculation filter 97. Weight coefficient r (i, j) is greater as a function of a closer location to the pixel of interest, and has a total sum of 1. Weighting coefficient r (i, j) is shown in FIG. 16. The binarization average value calculated by weighting coefficient r (i, j) is shown in the following equation (3).

$$m(x,y) = \sum_{i=-2}^{2} \sum_{j=-2}^{0} b(x+i, y+j) \times r(i,j) \quad (3)$$

Binarization average value m(x, y) calculated as above is applied to average error calculation unit 98. Binarization average error M (x, y) of the pixel of interest f (x, y) and binarization of average value m (x, y) is calculated by the following equation (4)

$$M(x, y) = f(x, y) - m(x, y) \quad (4)$$

The total sum of the calculated error data E (x, y) and binary average error M (x, y) is dispersed as error correction data.

Figure 17A:
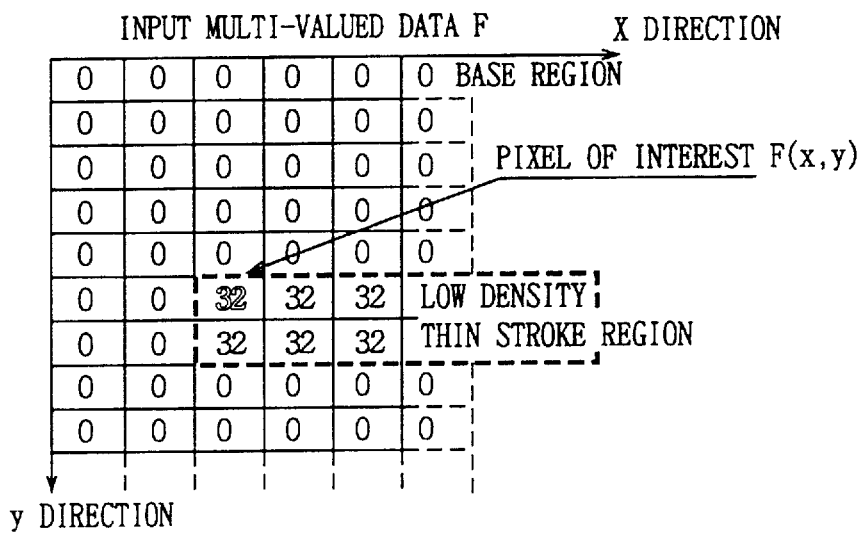
FIGS. 17a–17c show the value of each data in the third embodiment.
Figure 17B:
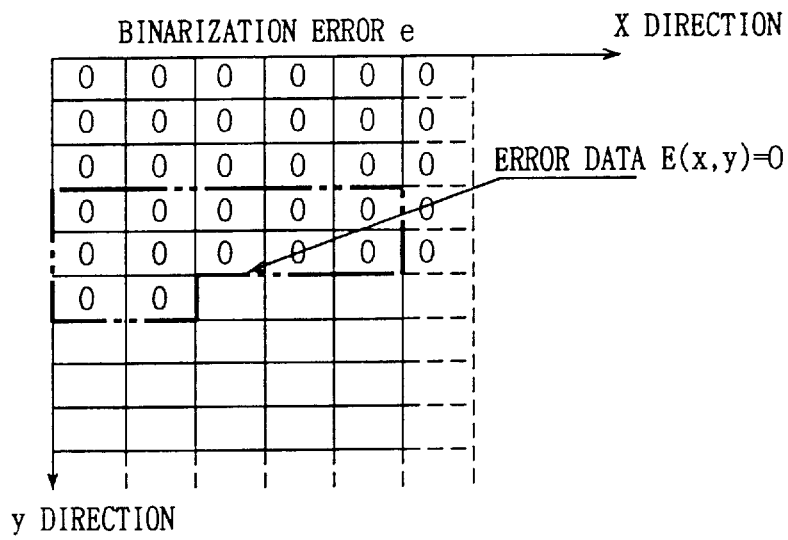
Figure 17C:
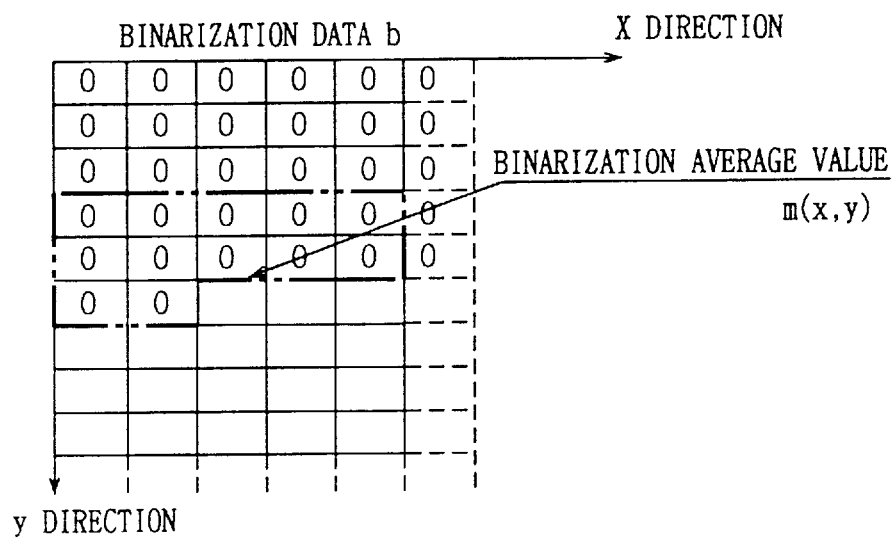

The effect of improving the disconnection of a low density thin stroke by binary image line memory 96~ average error calculation unit 98 will be described hereinafter. FIGS. 17a, 17b and 17c show input multi-value image data f (x, y), binarization error e (x, y), and binarization data b (x, y), respectively. Referring to FIG. 17a–17c, error data E (x, y) is 0 as described in the section of the background art when the input image data f (x, y) shows a transition from a white base (density data value of 0) to a low density thin stroke (density data value of 32). The image data f (x, y) of the pixel of interest is 32, whereas the data of binarization average value m (x, y) is 0. Therefore, the value of 32 is obtained as binarization average error M (x, y) according to the following equation (5).

Binarization average error $M(x, y) = f(x, y) - m(x, y) = 32$ (5)

As a result, error correction data f' (x, y) is corrected towards the blacker level by the following equations (6) and (7) to prevent disconnection in the reproduction of a low density thin stroke.

$$\begin{aligned}
\text{Error correction data } f'(x,y) &= f(x,y) + E(x,y) + M(x,y) \quad (6) \\
&= 32 + 0 + 32 \\
&= 64
\end{aligned}$$

Binarization error $e(x + 1, y) = 64 - 0 = 64$ (7)

Examples of printouts improved according to the above-described manner are shown in FIG. 18. It is appreciated from the printout of size 10.5 in FIG. 18 that the intermittent appearance of the horizontal line is eliminated.

FOURTH EMBODIMENT

In the fourth embodiment, a pseudo gradation representation by a ternarization average error diffusion process is carried out in contrast to the binarization average error diffusion process of the third embodiment.

FIG. 19 shows an entire structure of an error calculation unit 101 according to the fourth embodiment, and corresponds to FIG. 15 of the third embodiment. The basic structure of error calculation unit 101 of the fourth embodiment is basically similar to that of error calculation unit 90 of the third embodiment provided that relevant components associated with the binarization and the ternarization differs. More specifically, a ternarization unit 102, a ternarization error calculation unit 103, a ternarization image line memory 106, and a ternarization average calculation filter 107 are provided.

The operation thereof will be described hereinafter. Input multi-valued (256 gradation levels) image data F (x, y) is error-corrected by error correction unit 91 to be output as error correction data f (x, y). Error correction data f (x, y) is provided to binarization unit 102 to be ternarized (0, 128, 255) with fixed threshold values (TH1=64 and Th2=192). Ternarization error calculation unit 103 provides a ternarized error e (x, y) according to the following equation.

(i) When error correction data f (x, y)<Th1 (64):
Ternarization image data c=0, ternarization error e3 (x, y)=f (x, y)−0

(ii) When threshold value Th2 (192)>f (x,y)≧ threshold value Th1 (64):
Ternarization image data b=128, ternarization error e3 (x, y)=f (x, y)−128

(iii) When error correction data f (x, y)≧threshold value Th2 (192):
Ternarization image data c=255, ternarization error e3 (x, y)=f (x, y)−255

Three lines of ternarization error e3 (x, y) calculated as above are stored in error storage line memory 94. Then, error data E3 (x, y) for dispersing ternarization error e3 (x, y) to other pixels is calculated using peripheral error weighting filter 95. The weighting coefficient k (i, j) is similar to that of the third embodiment.

In the present fourth embodiment, three lines of ternarization image data c (x, y) are stored in ternarization image line memory 106, whereby an average value m3 (x, y) is calculated by ternarization average calculation filter 107. The weighting coefficient r (i, j) is identical to that of third embodiment.

Ternarization average error M3 (x, y) of the pixel of interest F (x, y) and ternarization average value m3 (x, y) is calculated by average error calculation unit 98 according to the following equation:

$$\text{Ternarization average error } M3(x, y)=F(x, y)-m3(x, y)$$

The total sum of the calculated error data E3 (x, y) and ternarization average error M (x, y) is dispersed as error correction data.

Similar to the third embodiment, error correction data f (x, y) is calculated towards the black level side to prevent an intermittent appearance of a low density thin stroke.

The above embodiment describes the case where input image data F (x, y) of 256 values is binarized or ternarized. In this case, the width of the data memory is one word of 1 bit. The input image data represented by 256 values may be converted into 4-ary, 8-ary, or N-ary representations. Here, N-ary means that one input signal is quantized into N signals. In this case, (N−1) terms of the threshold value are provided. A N-ary data memory becomes N bits per 1 word. Therefore, the multi-value of M of the input image and the value of N of N-ary data output may be set to arbitrary values.

FIFTH EMBODIMENT

It can be assumed that an error diffusion process of high picture quality and high speed can be implemented by combining the above-described binarization average diffusion technique and dither error diffusion technique. However, there is a possibility that advantages of the portrayal of images will be canceled by respective algorithms by just a simple combination.

In the fifth embodiment, the structure set forth in the following is adapted to circumvent the above possibility.

Figure 20:
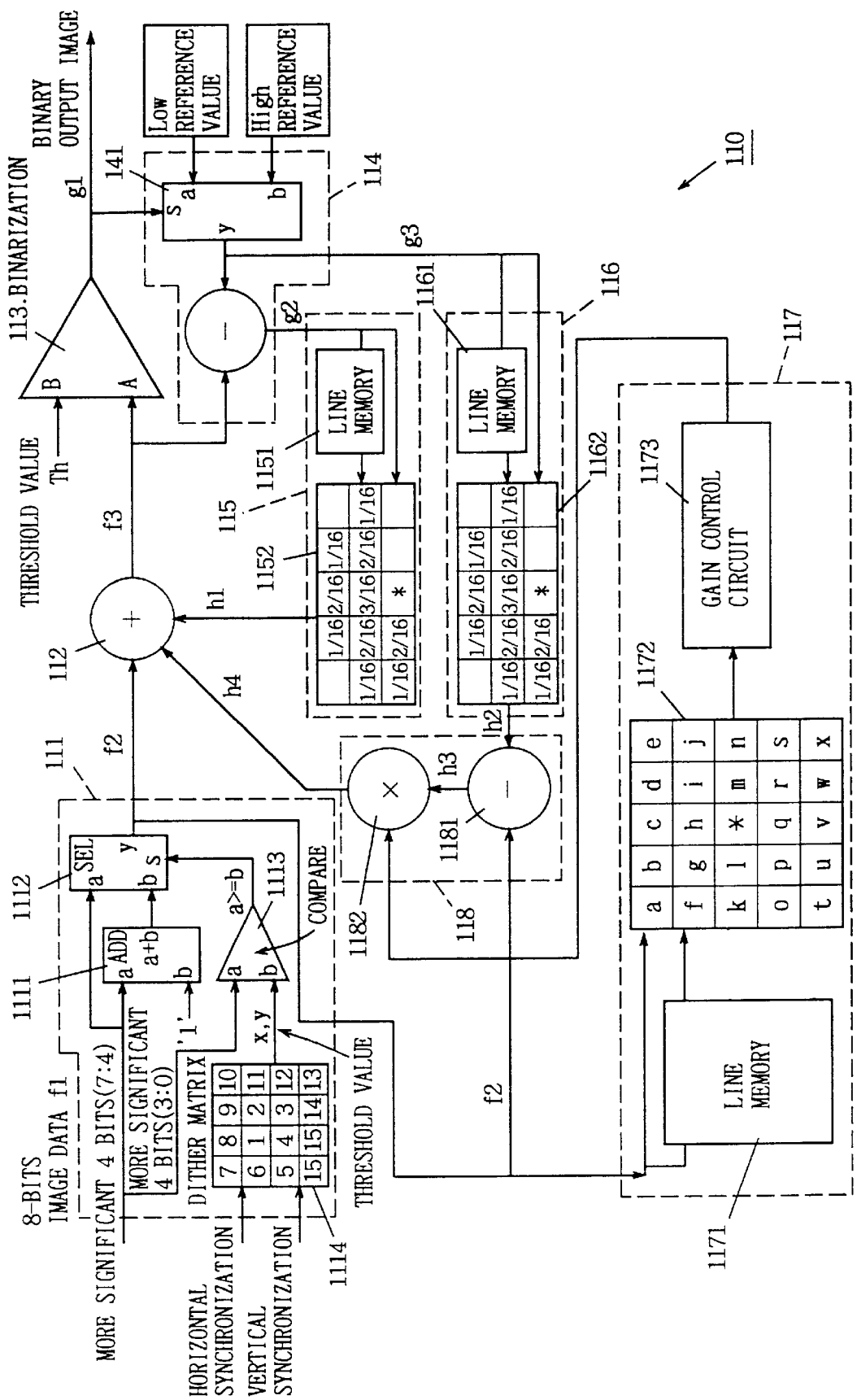
FIG. 20 is a block diagram showing a structure of an image processing circuit according to a fifth embodiment of the present invention.

FIG. 20 is a block diagram showing a structure of an image processing apparatus according to the fifth embodiment. Referring to FIG. 20, an image processing apparatus 110 includes a multi-value dither circuit 111 for converting an input image data of 8 bits into dither image data of 4 bits, an error correction unit 112 for error-diffusing the 4-bit dither image data from multi-value dither circuit 111 with error data in the binarization process that will be described afterwards, a binarization unit 113 connected to error correction unit 112 for binarizing a dither image data error-corrected with a predetermined threshold value Th, a binarization error calculation unit 114 for calculating the difference between error-corrected dither image data applied to binarization unit 113 and binarization output image data, a binarization error diffusion unit 115 for error-diffusing the calculated binarization error, a binarization average error diffusion unit 116 for providing the error of a binarization average density of binarized output image data and the original image data, an attribute determination unit 117 for making determination of the attribute of the image according to the image data of 4 bits of 4×4 dither matrix provided from multi-value dither circuit 111, and an adjustment unit 118 for adjusting the binarization average density error according to a determination result from attribute determination unit 117.

The operation thereof will be described hereinafter. Input image data f1 is converted into dither image data f2 by multi-value dither circuit 111. Dither image data f2 is error-corrected by error correction unit 112 to be provided as error correction data f3. Error correction data f3 is output as binary output image g1 from binarization unit 113. Binary output image data g1 is converted into a reference value g3 according to the value by binarization error calculation unit 114. Binarization error data g2, which is the difference between reference value g3 and error correction data f3, is also calculated in the error calculation unit 114. Converted binarization error data g2 is applied to binarization error diffusion unit 115 to be output to error correction unit 112 as binarization error diffusion data h1. Reference value g3 is applied to binarization average error diffusion unit 116. Binarization average error density data h2 from binarization average error diffusion unit 116 is processed by adjustment unit 118 which will be described afterwards to be provided to error correction unit 112 as error correction data h4.

Attribute determination unit 117 includes a dither storage line memory 1171 for storing 5 lines of the dither matrix image data. A 5×5 local window is generated by dither storage line memory 1171. The maximum value and the minimum value in the 5×5 local window are detected by a maximum/minimum value detection filter 1172. According to the difference thereof, the attribute of the image is detected by a gain control circuit 1173 connected to maximum/minimum value detection filter 1172. More specifically, image data is determined as having a non-dispersion attribute when the difference between the maximum value and the minimum value is small. Image data is determined as having a dispersion attribute when the difference therebetween is great.

Figure 21:
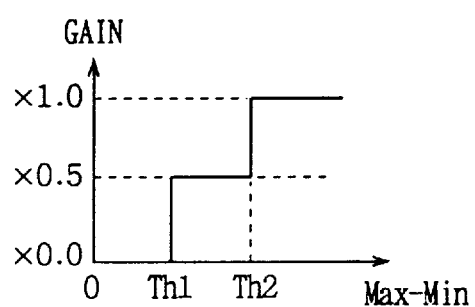
FIG. 21 is a diagram for describing the contents carried out in a gain control circuit.

FIG. 21 is a diagram for describing a specific operation of gain control circuit 1173. Referring to FIG. 21, a gain is determined according to the difference between the maximum value and the minimum value detected by maximum/minimum detection filter 1172. More specifically, gain control circuit 1173 includes gain conversion threshold values Th1 and Th2 for dividing the difference of the maximum value and the minimum value into three. According to the threshold value, a gain according to the attribute of the image is determined. More specifically, when the difference between the maximum value and the minimum value is smaller than threshold value Th1, the gain is 0. When the difference is between threshold values Th1 and Th2, the gain is set to 0.5. When the difference is greater than threshold value Th2, the gain is set to 1.

Referring to FIG. 20 again, adjustment unit 118 includes a subtraction circuit 1181 for calculating the error between dither image data f2 provided from multi-value dither circuit 111 and average density h2 of the output binary image provided from binarization average error diffusion unit 116, and a multiplication circuit 1182 for multiplying error data h3 obtained as a result of the subtraction by a gain according to the attribute of the image obtained by gain control circuit 1173. Error diffusion data h4 adjusted as above is provided to error correction unit 112 to carry out error diffusion with respect to dither image data f2.

According to the image processing circuit of the fifth embodiment shown in FIG. 20, the maximum value and the minimum value of a local region in the image are detected, whereby the attribute of the image is identified according to the value thereof. For example, in a computer graphics or the like, dispersion of the density is so small that the difference between the maximum value and the minimum value in the local region is extremely small. Control is carried out so that the feedback amount of the binarization average error is reduced as the difference between the maximum value and the minimum value becomes smaller. More specifically, when dispersion is extremely small, correction of the binarization average density error is canceled, and only dither error diffusion is carried out. As a result, generation of a stripe pattern inherent in a portrayal of image where the dispersion is extremely small as in a computer graphics image can be prevented.

SIXTH EMBODIMENT

Prior to the description of the sixth embodiment of the present invention, the background of the technique thereof will be described.

In image processing, a data process of binarizing the lightness/darkness of an image including continuous gradation levels into 0 and 1 is carried out.

Figure 22:
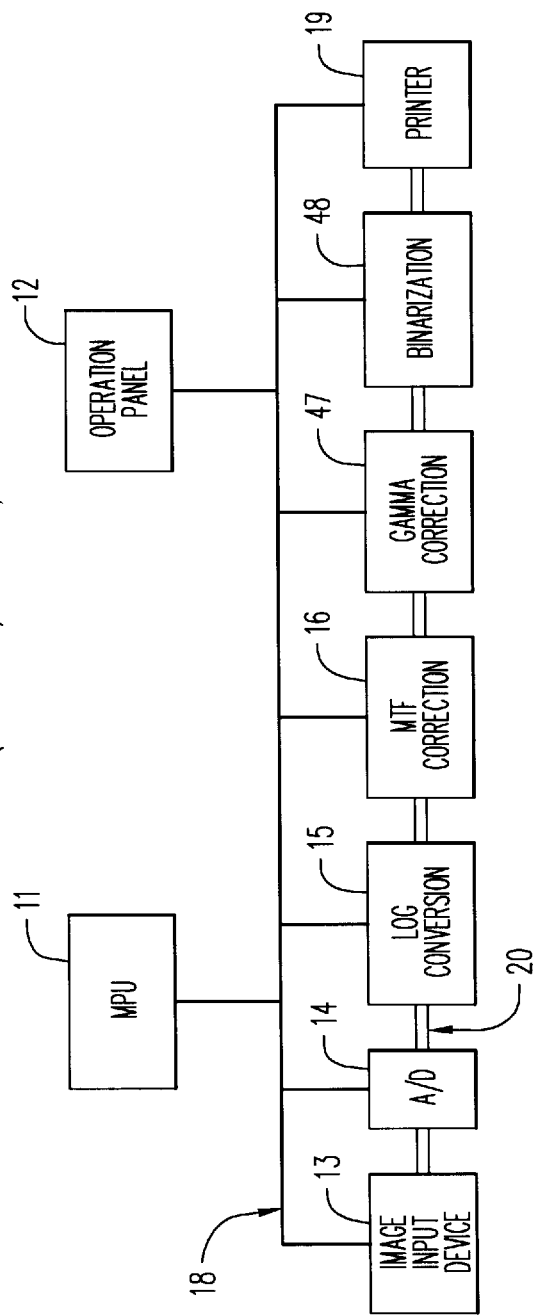
FIG. 22 is a block diagram showing a structure of a conventional image processing apparatus.

FIG. 22 is a block diagram showing a structure of a conventional image processing apparatus. Referring to FIG. 22, a conventional image processing apparatus 100 includes a MPU (Micro Processor Unit) 11 for controlling the entire apparatus, an operation panel 12 for effecting operation of image processing apparatus 100, an image input device (readout sensor) 13 formed of a photoelectric device such as a CCD and a driving system thereof, an A/D conversion device 14 for converting an input analog image data into digital data, a Log conversion device 15, a sharpness correction device MTF (Modulator Transfer Function) 16, a gamma correction device 47, an image binarization device 48, and a printer (image recording device) 19. Each device is connected to MPU 11 and operation panel 12 via an MPU system bus 18. Each device is connected to each other via an image bus 20.

Image input device 13 includes a readout sensor for scanning mixed format original of a continuous tone image and line copy image for generating a sampling analog signal. A/D conversion device 14 quantizes the sampling analog data as continuous tone reflectance data where one pixel has a value of 8 bits (256 gradation levels), for example. Log conversion device 15 provides a 8-bit continuous tone density level which has a log relationship with the continuous tone reflectance data from the continuous tone reflectance data.

Sharpness correction device 16 corrects the sharpness of a continuous tone density image using a digital filter such as a Laplacian filter. Gamma correction device 117 carries out gamma correction having nonlinear gamma correction data set in a LUT (lookup table) RAM of approximately 8 bits of 256 words, for example, by MPU 11 for correcting the difference in the gradation curve of image input device 13 and printer 19 to implement a desired gamma characteristic as the entire image processing apparatus 100, or to set a desired gamma characteristics of the user.

Image binarization device 118 converts the gamma-corrected 8-bit continuous tone density data into binary data of 1 bit according to its light/dark level using an area gradation binarization technique of the error diffusion binarization process. The converted 1-bit binary data is printed on a recording medium by printer 19 (electronic photo printer or ink jet printer).

It is to be noted that gamma correction device 47 is an important device indispensable in image processing apparatus 100 in order to set a desired gamma characteristic of the system or to set an arbitrary gamma characteristic reflecting the nature of the original.

In general, a nonlinear gamma characteristic is preferable for a line copy original. The reason is set forth in the following. The density distribution of a line copy original is generally divided into the background region (low density region) and the line copy region (middle to high density region). In the case of linear gamma characteristics, a change in the gamma gradient in response to a change in the density of the line copy portion results in the density of the background portion also being altered in a linear manner. Therefore, if the gamma gradient is increased in order to increase the density of the line copy region, the density of the background region will also be increased, resulting in the generation of "fogging" at the background area.

In order to prevent such fogging, the so-called nonlinear S-character type gamma characteristic is desirable in which the gamma gradient is small at a low density area corresponding to the background region, and abrupt at the middle to high density region corresponding to a line copy region. A linear gamma characteristic is shown in FIG. 23, and a nonlinear S-character gamma characteristic shown in FIG. 24.

Figure 23:
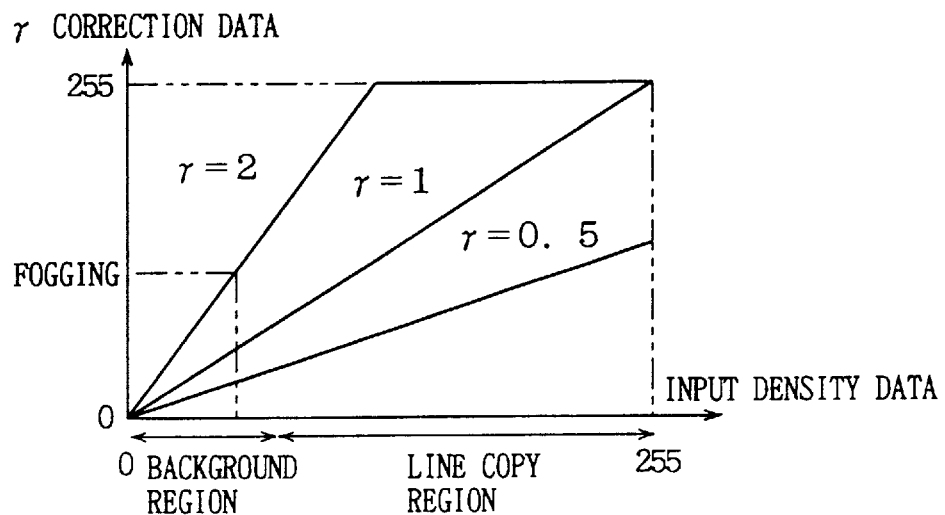
FIG. 23 shows linear gamma characteristics.
Figure 24:
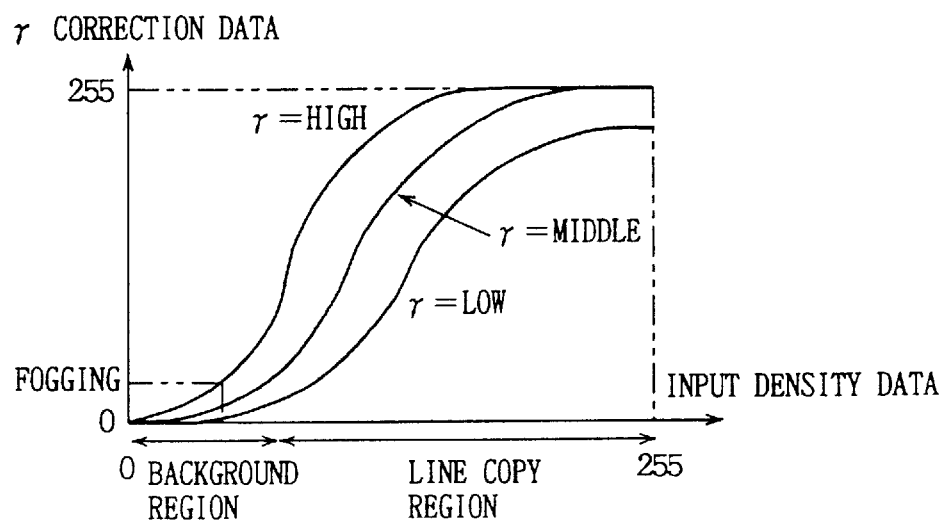
FIG. 24 shows nonlinear S-character gamma characteristics.

It is appreciated from FIGS. 23 and 24 that the gradient is severe as the gamma is greater in the linear gamma characteristic, and that the rising edge is greater as the gamma is increased in the nonlinear S-character gamma characteristic. In the figures, the background region and the level of the fogging are both shown.

Although linear gamma characteristics can be realized by a combination of a few number of addition logic circuits, it is difficult to obtain a desired nonlinear gamma characteristic with a linear operation device by a combination of logic circuits. Therefore, desired characteristics are realized generally using an LUT with a RAM of a capacity of approximately 8 bits and 256 words. MPU 11 provides a desired conversion LUT. In a gamma correction image process, conversion data is provided according to an input address value.

Figure 25:
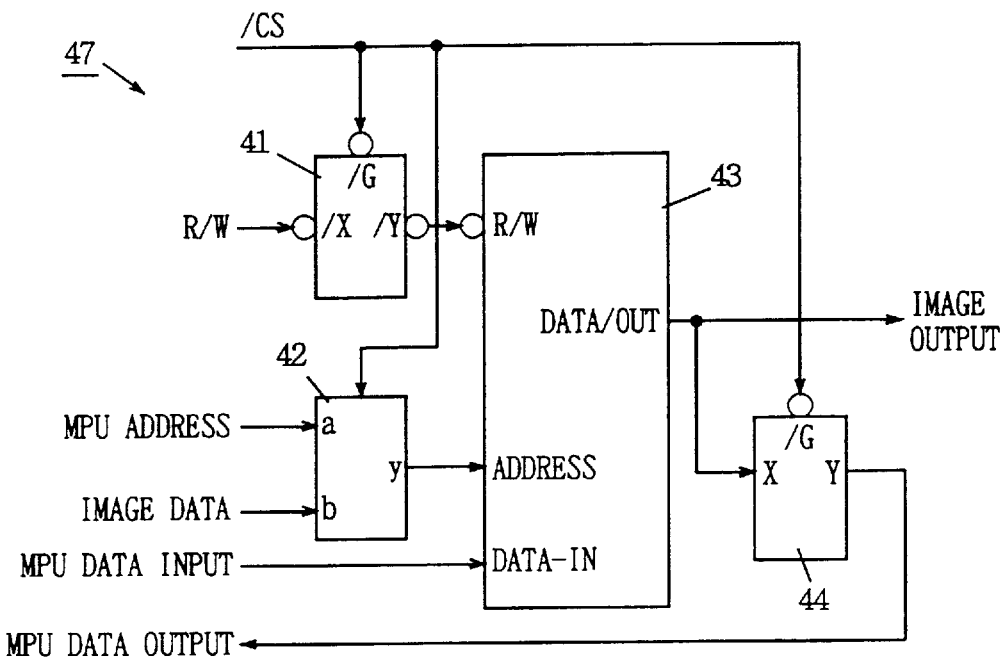
FIG. 25 is a block diagram showing a structure of a gamma correction device using a conventional RAM.

FIG. 25 is a block diagram showing in detail gamma correction device 117 using the RAM shown in FIG. 22.

Referring to FIG. 25, gamma correction device 47 includes a gate 41 receiving a chip select signal (/CS) at a terminal /G via MPU system bus 18 and a readout/write single (R/W) at a terminal /X, a selector 42 receiving a chip select signal and an address signal via system bus 18 and an image signal via an image bus 20 for providing an address signal, a RAM 43 for receiving a read/write signal from gate 41, an address signal from selector 42, and a data input signal from MPU 11 via system bus 18 to provide a data output, and a gate 44 receiving chip select signal at a terminal /G and a data output signal at a terminal X for providing a data output signal to MPU 11 from terminal Y via system bus 18.

MPU 11 drives the chip select signal to an L level to validate the read/write signal of MPU 11 at gate 41. Selector 42 selects an MPU address, whereby the data output from MPU 11 is validated by gate 44. As a result, RAM 43 is disconnected from image bus 20 and connected to system bus 18, allowing writing/reading with MPU 11. When MPU 11 drives the chip select signal to an H level (logical high), RAM 43 is disconnected from system bus 18 and connected to image bus 20 to carry out the above-described gamma correction.

An approach is considered of carrying out gamma correction utilizing the characteristics of error diffusing techniques which is the above-described binarization process. According to the error diffusion technique, the density difference (binarized error) between an input image and an output image for every pixel is calculated. The calculated result is dispersed after applying a particular weight on the peripheral pixels. This technique is reported in "An Adaptive Algorithm for Spatial Gray Scale" SID. 17. pp. 75–77 (1976) by R. W. Floyd and L. Steinberg.

The technique of varying the gamma characteristics by changing the reference value in calculating binarization error in an error diffusion binarization circuit is disclosed in "Image Process Handbook" (published by Tokyo University).

Figure 26:
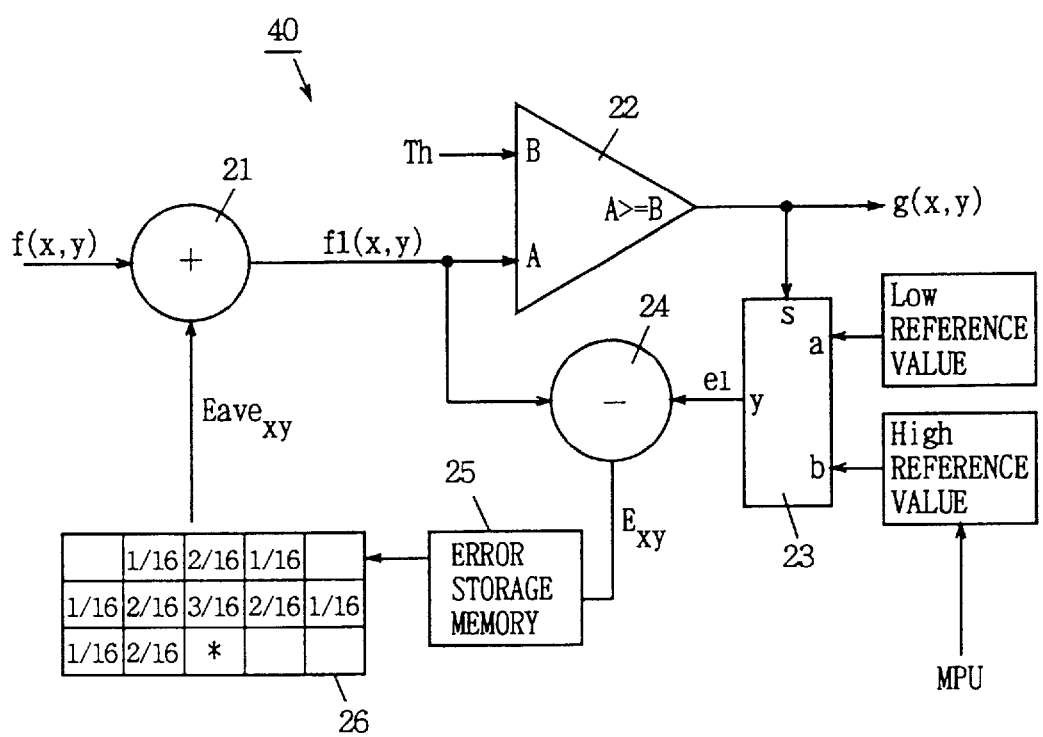
FIG. 26 is a block diagram showing a structure of an image binarization device modifying conventional gamma characteristics.

FIG. 26 is a block diagram showing the main components of the error diffusion binarization circuit disclosed in the above-mentioned "Image Processing Handbook". Referring to FIG. 26, an error diffusion binarization circuit 40 includes an adder 21 for correcting image data f (x, y) of a multibit (for example, 256 gradation levels) with error data $Eave_{xy}$, a comparator 22 connected to adder 21 for binarizing error correction data f1 (x, y) with a predetermined binarization threshold value Th, a selector 23 receiving 1-bit binary data g (x, y) for providing a predetermined value on the basis of a reference value of an H or an L level by designation of MPU 11 according to the received value, a subtractor 24 for calculating the difference between value e1 (x, y) provide from selector 23 with error correction data f1 (x, y), error storage memory 25 for storing three lines of the calculated binarization error $E_{xy}$, and an error weighting filter 26 for calculating a weight average $Eave_{xy}$ for diffusing binarized error data $E_{xy}$ to other pixels.

Equations representing binarization error $E_{xy}$ and weighting average value $Eve_{xy}$ are set forth in the following.

$$E_{xy}=f(x, y)-g(x, y) \tag{6}$$

$$Eave_{xy} = \frac{1}{\sum_{k,l\in S} \sum m_{k,l}} \sum_{k,l\in S} m_{k,l}E_{x-k,y-l} \tag{7}$$

Here, $E_{xy}$ and $Eave_{xy}$ represent the values of binarization error and integral data of the pixel of respective addresses (x, y).

k and l indicate addresses in the vertical direction and the horizontal direction of error weighting filter 26 arranged in a matrix. k and l vary within the range of the filter. $m_{k,l}$ in equation (7) indicates the coefficient of address ($k,l$) in error weighting filter 26.

According to the equation, the gamma correction characteristics can be quickly modified by MPU 11 or by a region determination device not shown during image processing since an arbitrary linear gamma correction characteristic can be obtained by just setting two reference values of H and L.

In practice, binarization error $E_{xy}$ is represented by $$E_{xy}=f(x, y)+Eave_{xy}-g(x, y) \tag{8}$$

to form a feedback loop as shown in the drawing.

The RAM is disconnected from system bus 18 when gamma correction device 117 is used. Therefore, a gamma correction process cannot be carried out during the access of RAM 43 by MPU 11. Furthermore, access from MPU 11 must be inhibited during a gamma correction process. Since approximately 256 words are generally required for the number of write words of RAM 43, the access time from MPU 11 is time-consuming as "access time×256". This means that the gamma correction is interrupted during this long period. Thus, there was a problem that gamma correction device 47 which carries out nonlinear S-character correction using a conventional RAM cannot easily modify the gamma correction data to an arbitrary value during image processing.

According to the gamma correction method using the characteristics of error diffusion techniques, only linear gamma correction can be set. Therefore, the aforementioned problem of "fogging" cannot be solved. FIGS. 27a–27c show examples of "fogging" when the reference value is modified according to the error diffusion binarization process shown in FIG. 26, and FIGS. 27a–27c. FIGS. 27a, 27b, and 27c show examples when the reference value is 384, 255, and 128, respectively. It is appreciated from FIGS. 27a–27c that a greater gamma coefficient aimed to increase the density of the line copy region will also increase the density of the background region to result in the generation of "fogging".

It is also known that rendition of low density thin strokes is poor, which is an important problem in the error diffusion binarization technique. Since the size of 1 dot is fixed and the level of graduation of the image is represented by changing the density of the dots in error diffusion, high frequency image cannot be reproduced in low density regions.

In recapitulation, the conventional gamma correction method has the following problems.

(i) "Fogging" is encountered in the linear correction method (ii) According to the method of linear gamma conversion by modifying the reference value of binarization error calculation in error diffusion binarization techniques, limitation of a low density thin stroke is not sufficient, in addition to the problem of "fogging".

(iii) In a non-linear correction process, the correction characteristic cannot be modified speedily. Furthermore, the cost of the device is increased since an RAM must be incorporated.

Figure 28A:
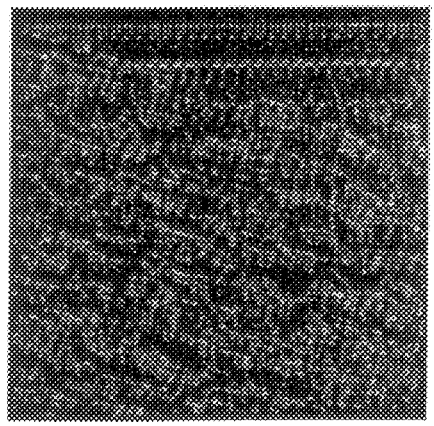
FIGS. 28a and 28b and FIGS. 29a and 29b are diagrams for describing problems in an error diffusion binarization technique.
Figure 28B:
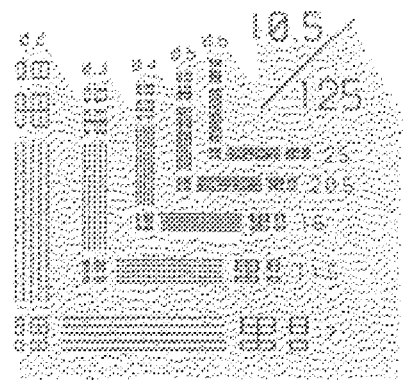

Additionally, there was a problem that a specific stripe pattern called snake-like or worm-like artifacts as shown in FIGS. 28a and 28b are generated in processing an image of a uniform density level with small dispersion according to the error diffusion binarization process. This is caused by the fact that the error is diffused with a constant pattern of an image of a uniform density level.

Figure 29A:
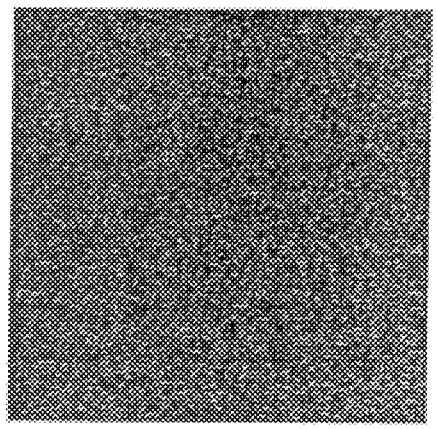
Figure 29B:
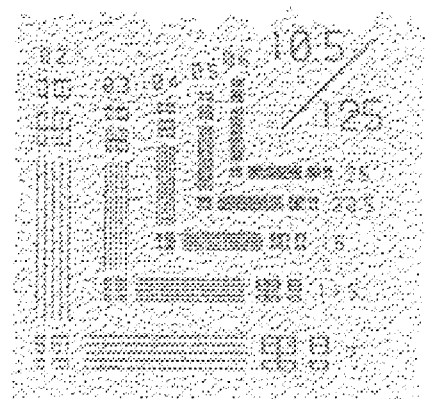

In order to solve the above-described problems and to reduce the snake-like artifact, various approaches have been made to prevent error diffusion of the aforementioned constant pattern by controlling any of the feedback elements of the error diffusion with a random number. Output images obtained by such an approach are shown in FIGS. 29a and 29b. Although this approach is effective in reducing the snake-like artifacts, the above-described other problems are not solved as shown in FIGS. 29a and 29b.

The invention of the sixth embodiment is directed to solve the above problems. An image processing apparatus is provided that allows nonlinear gamma correction simply and at low cost, and that can output a desired image with the generation of the snake-like artifacts reduced.

FIG. 30 is a block diagram showing a structure of an image processing apparatus 10 according to the present invention. The image processing apparatus of FIG. 30 differs from the conventional image processing apparatus 100 of FIG. 22 in that an image binarization circuit 17 is provided instead of gamma correction circuit 47 and image binarization device 48. The remaining components are similar to those of the conventional image processing device 100. Corresponding components have identical reference characters allotted.

Figure 31:
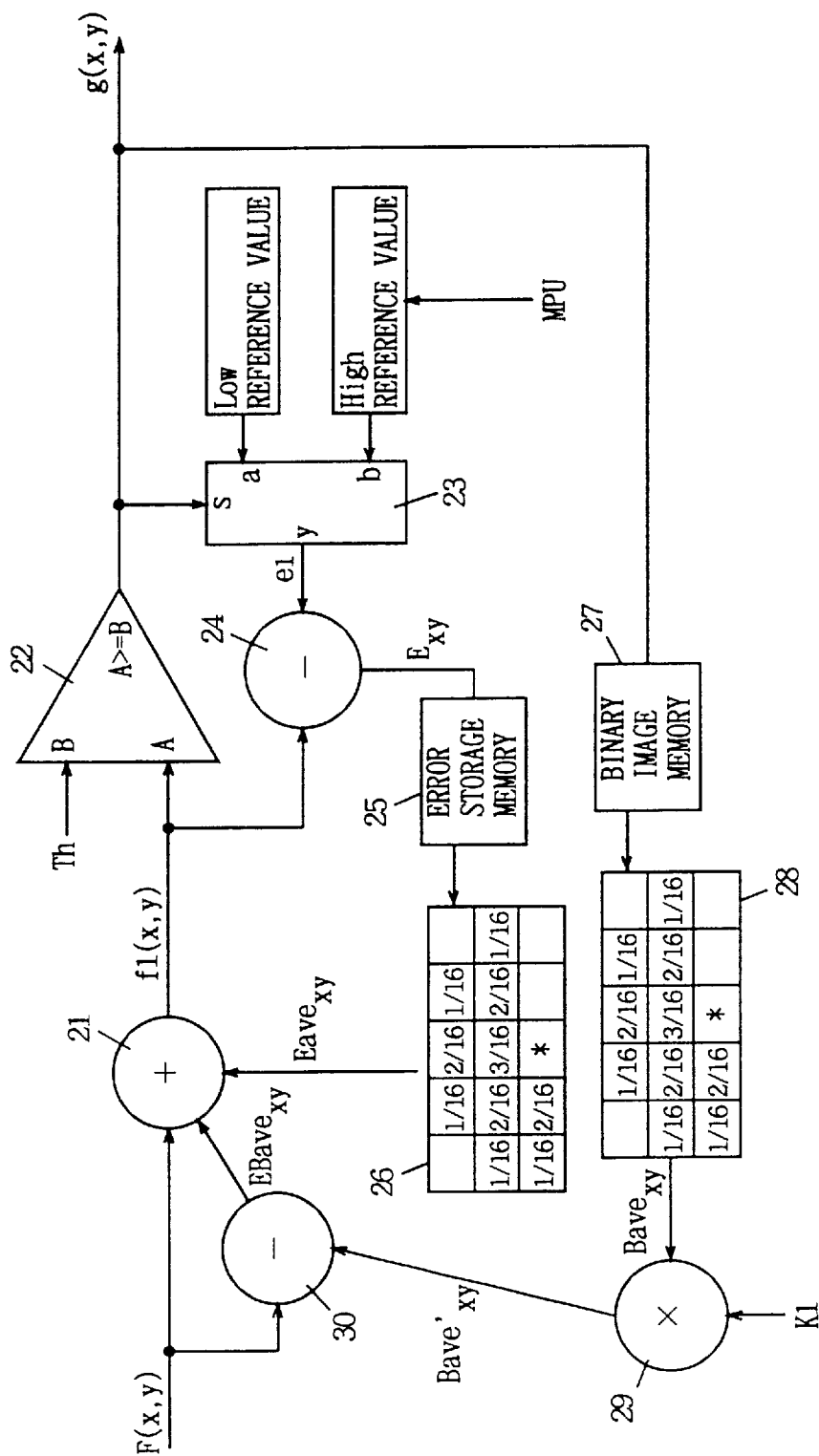
FIG. 31 is a block diagram showing a structure of an image binarization circuit applied in the sixth embodiment.

FIG. 31 is a block diagram showing a structure of the sixth embodiment of image binarization circuit 17 shown in FIG. 30. Similar to the conventional image binarization device 48 shown in FIG. 26, image binarization circuit 17 of FIG. 31 includes a first operation loop for diffusing the binarization error to perpherial pixels. The first operation loop includes an adder 21, a comparator 22, a selector 23, a subtractor 24, an error storage memory 25, and an error weighting filter 26. These components are similar to those shown in the conventional image binarization circuit 48 described with reference to FIG. 26. Corresponding components have the same reference characters allotted.

Image binarization circuit 17 of the sixth embodiment includes, in addition to the first operation loop, a second operation loop including a binary image memory 27 for storing several lines of binarization result g (x, y) (1-bit data of 0 or 1), a binarization average density weighting filter 28 for calculating a binarization result weighting average (binarization average density) $Bave_{xy}$ of the periphery of the pixel of interest (addition data with respect to the pixel of address (x, y), the same applies hereinafter), a multiplier 29 for applying an operation for carrying out a gamma correction with respect to binarization average error, and a subtractor 30 for calculating the difference between output $Bave'_{xy}$ from multiplier 29 and the input image data. Subtracted resultant data $EBave_{xy}$ from subtractor 30 and error weight data $Eave_{xy}$ from weighting filter 26 are applied to adder 21, so that binarization error is dispersed to peripheral pixels. Thus, the 8-bit continuous tone density data is converted into 1-bit binary data according to the density level by area gradation. The converted 1-bit binary data is printed onto a recording medium by printer 19 (electronic photo printer or ink jet printer).

Figure 32:
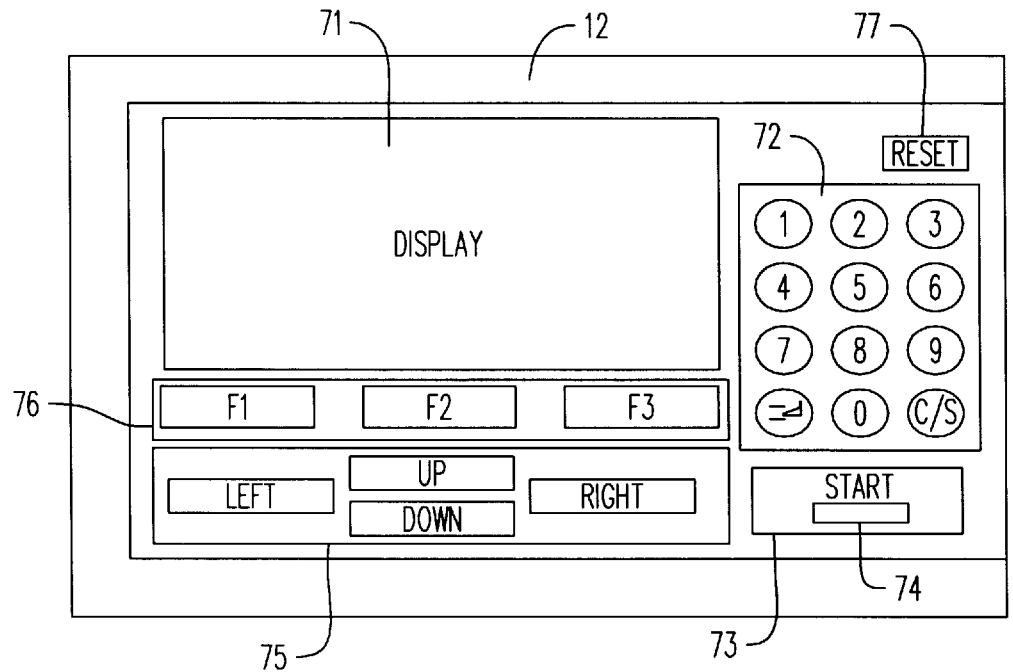
FIG. 32 shows a structure of an operation panel.

FIG. 32 shows a structure of an operation panel 12 of the image processing apparatus of the present invention.

Referring to FIG. 32, operation panel 12 includes a display 71 for displaying information formed of liquid crystal, a ten key 72 for entering numerics, a start key 73 for initiating operation of reading/copying/printing, a lamp 74 for indicating the operational state, a cursor key 75 for selecting one of the selection branches displayed on information display 71, a function key 76 for selecting one of the three selection branches displayed on display 71, and a reset key 77.

Figure 33:
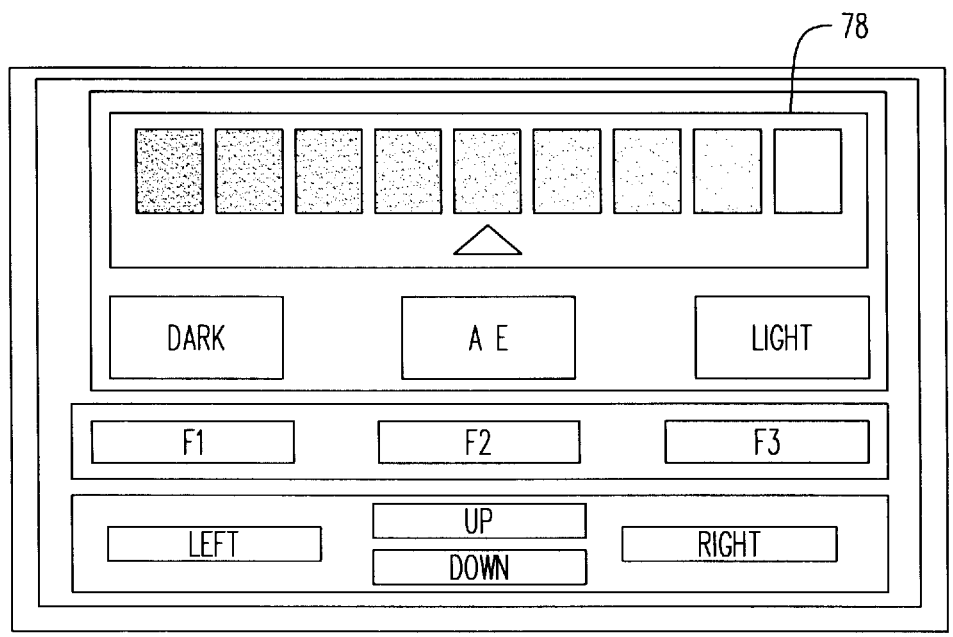
FIG. 33 shows an operation panel where a density adjustment mode is set.
Figure 34:
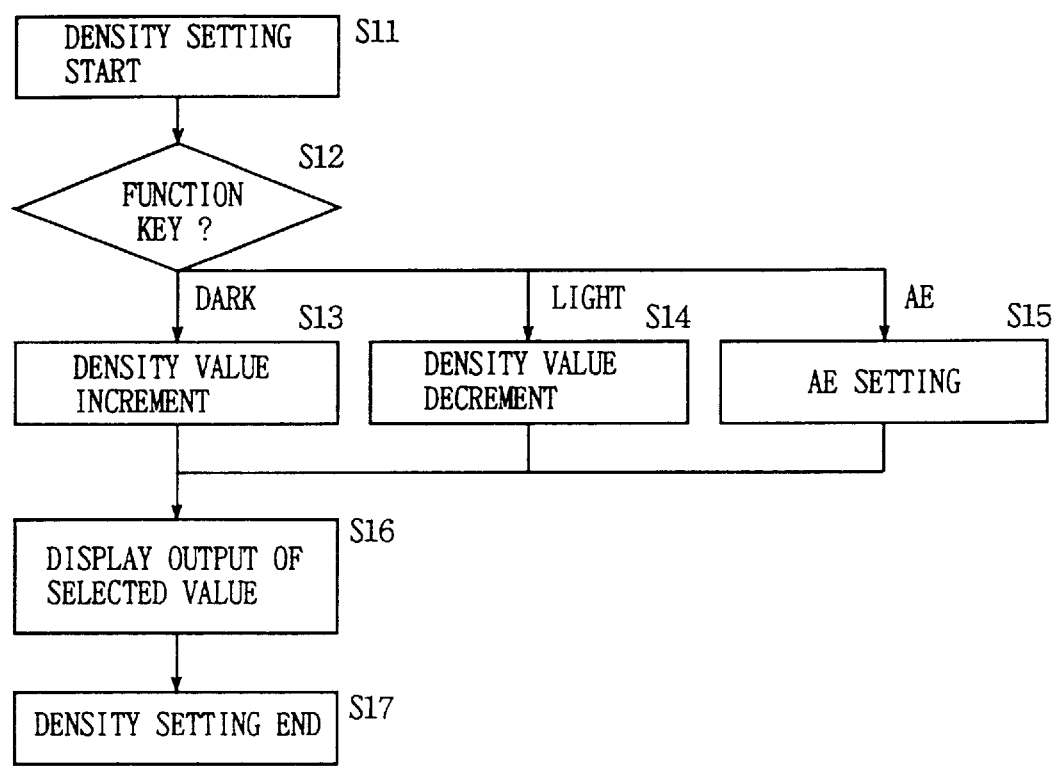
FIG. 34 is a flow chart showing a density set operation in a density adjustment mode.

FIG. 33 shows the display when the density adjustment mode is set on operation panel 12 shown in FIG. 32. FIG. 34 is a flow chart showing the operation in a density adjustment mode. The density adjustment mode will be described hereinafter with reference to FIGS. 33 and 34.

Upon transition to a density adjustment mode on operation panel 12 by the user setting, a density set screen of 9 steps, for example, is shown on display 71 (step S11 in FIG. 33). Simultaneously, "DARK" "AE" and "LIGHT" corresponding to F1–F3 of function key 76 are displayed on the screen. The selection of "DARK" causes the Δ cursor to be shifted one by one leftwards. The gamma characteristic is set so that the output image is darker than the central value. Selection of "LIGHT" causes the Δ cursor to be shifted one by one rightwards. The gamma characteristic is set so that the output image is lighter than the central value. When "AE" is selected, the density will be automatically set to an optimum value according to the original (steps S12–S15).

The display of the screen varies according to the selected value to complete the density setting (steps S16 and S17).

The gamma correction operation carried out by multiplier 29 will be described hereinafter. Data $Bave'_{xy}$ is derived by multiplying the binarization average density of $Bave_{xy}$ by the coefficient k1 from MPU11. When coefficient k1 is greater than 1 (for example 1.5) for binarization average density $Bave_{xy}$, the output binarized result will exhibit high density with respect to the input data in the second loop. Therefore, an error correction action to cancel this trend is effected in the second loop. Therefore, the gamma characteristics take a lighter value as shown in FIG. 35a.

When a coefficient k1 smaller than 1 (for example 0.5) is multiplied, the output binarized result will take a value of low density with respect to the input data in the second loop. An error correction action to cancel this trend is effected in the second loop. Therefore, the gamma characteristics exhibit a darker one as shown in FIG. 35c. FIG. 35b shows the case where the coefficient k1 is 1.0.

As shown in FIG. 31, binarized average density weighting filter 28 becomes greater as a function of a closer location to the image pixel of interest. Filter 28 has total sum of coefficient 1 to provide an average value weighted by the binarized result. It has an integral characteristic approximating the Gauss distribution. Therefore, the binarized average value with respect to the spatial frequency of the obtained binarized image is nonlinear.

It is to be noted that the size of one dot is fixed (1 dot) and the gradation is represented by the density thereof in the error diffusion technique.

Figure 36A:
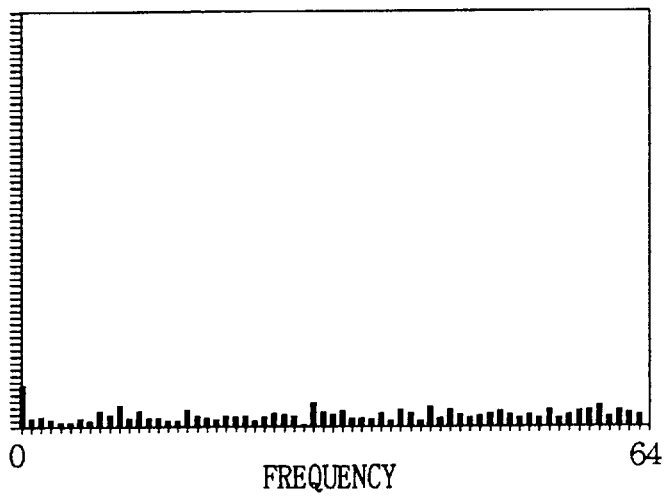
FIGS. 36a, 36b and 36c are graphs analyzing by FET an output binary image which is binarization of an input image for each density level.
Figure 36B:
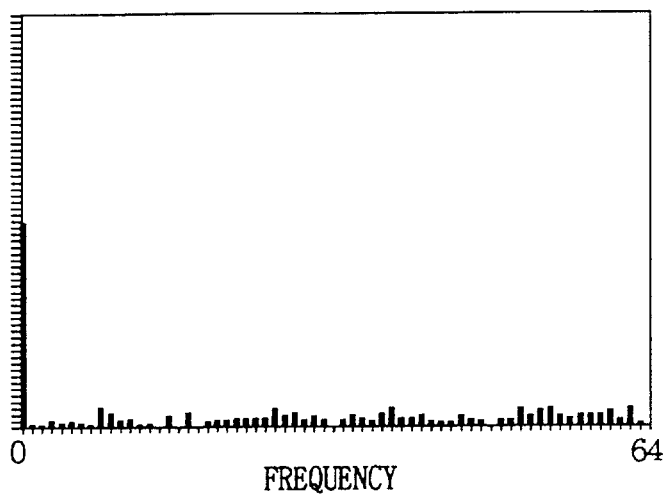
Figure 36C:
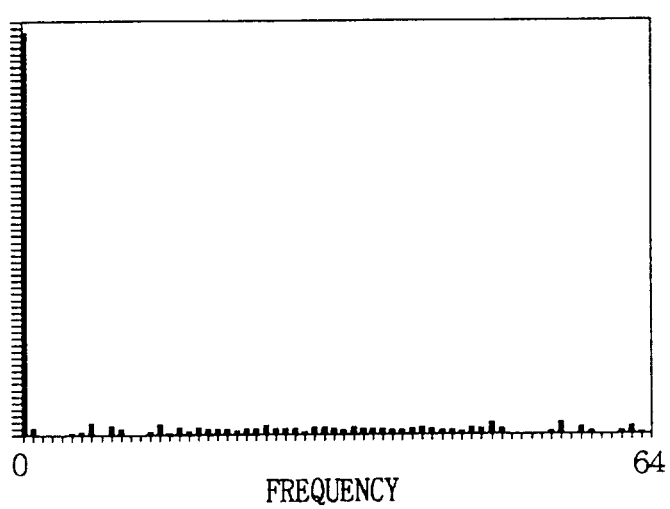

FIGS. 36a–36c are graphs showing the result of input image f (x, y) having three gradation levels of 16, 128, and 255 binarized by error diffusion to be analyzed by fast Fourier Transform (FFT). The mechanism of realizing nonlinear gamma correction will be described with reference to these graphs.

It is appreciated from FIG. 36a that the density distribution of dots is "sparse" when the input image has a low density (level 16). In other words, the probability of one dot existing independently (an independent dot of either white or black) is high. This is the case where the ratio of including the high frequency component is high when spatial frequency conversion is carried out. In other words, the ratio of the low frequency component with respect to the entire frequency region is small.

It is appreciated from FIGS. 36b and 36c that the dot are more "dense" as the density of the input image becomes higher, so that the probability of an independent dot becomes lower. The occupying ratio of the low frequency component on the spatial frequency becomes higher. In calculating the binarization average density using an integral filter approximating a Gauss distribution such as binarization average density weighting filter 28, the output is low when the dots are "sparse" in comparison with the case of "dense" since the binarization average value has a high sensitivity with respect to low frequency but a low sensitivity with respect to a high frequency.

Therefore, the influence of multiplying the binarization average density by a constant is small when the dots are "sparse" in comparison with the case where the dots are "dense". Thus, nonlinear gamma correction characteristics can be obtained that has a small change in the low density and a greater change as function of a higher density. An economical gamma correction device reduces fogging and that allows characteristic modification at high speed can be realized.

SEVENTH EMBODIMENT

Figure 37:
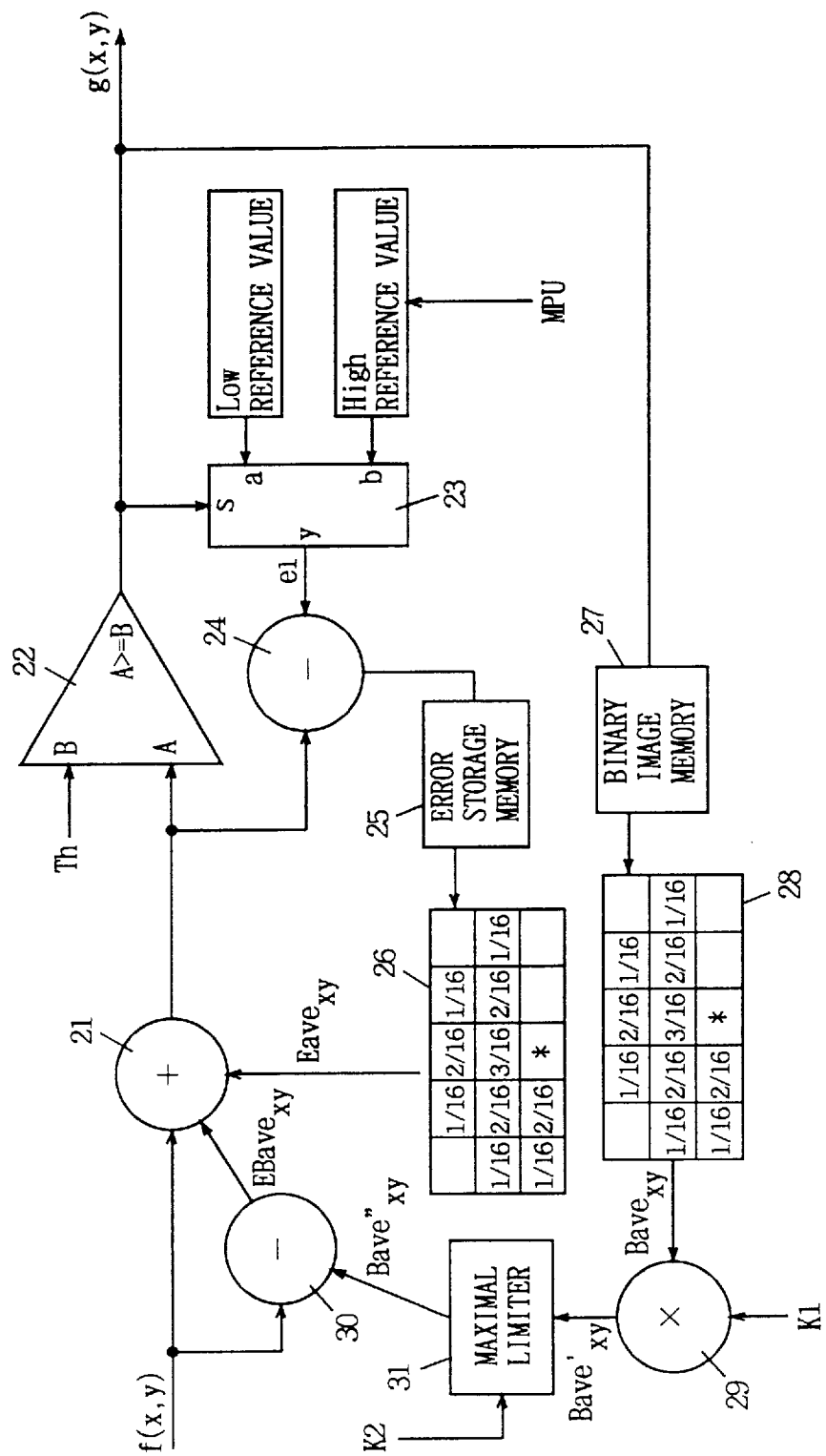
FIG. 37 is a block diagram showing a structure of an image binarization circuit according to a seventh embodiment of the present invention.

FIG. 37 is a block diagram showing another structure of image binarization circuit 17 of the present invention. Referring to FIG. 37, the seventh embodiment has a maximal limiter 31 provided with respect to an output from multiplier 29 of the sixth embodiment. The maximum value of the density is limited by maximal limiter 31. This limitation is controlled by a coefficient k2 provided from MPU 11. An output from maximal limiter 31 is provided to subtractor 30. Components other than this maximal limiter 31 are similar to those of the sixth embodiment. Corresponding components of the same reference characters allotted, and their description will not be repeated.

Gamma correction operation according to the seventh embodiment will be described in detail. When binarization average density $Bave_{xy}$ is multiplied by a coefficient k1 greater than 1 (for example 1.5), the output binarized result always takes a higher density with respect to the input data. Therefore, an error correction action to cancel this trend is effected in the second loop.

Therefore, the gamma characteristic exhibits a lighter density in both the background region and the line copy region as shown in FIG. 35*a*. Particularly in the case of an original formed of a line copy, the object of setting the density adjustment to a lighter value is to suppress the fogging phenomenon in the background region. It is required to increase the density of the line copy region. To accommodate this requirement, maximal limiter 31 is provided to limit the maximum density after operation of the coefficient multiplication by multiplier 29.

Figure 38:
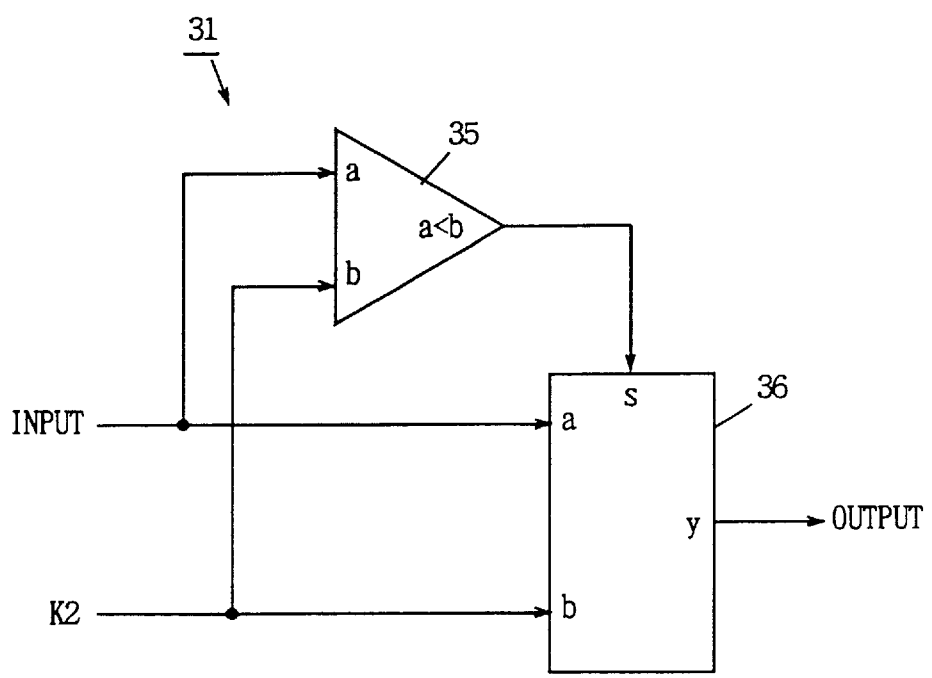
FIG. 38 is a block diagram showing a structure of a maximal value limiter.

FIG. 38 is a block diagram showing a specific structure of maximal limiter 31. Referring to FIG. 38, maximal limiter 31 includes a comparator 35 receiving multiplied density data from multiplier 29 at terminal a and receiving maximum limit value k2 from MPU 11 at terminal b, and a selector 36 receiving a comparison resultant data from comparator 35, density data from multiplier 29 and maximum limit value k2 from MPU 11 to provide a data having the maximum value limited.

Comparator 35 compares the input data with maximum limit value k2 set by MPU 11. When the input data is greater than maximum limit value k2, the above-described maximum value is selected and output by selector 36. When the input data is smaller than the maximum limit value k2 of $Bave'_{xy}$, input data $Bave'_{xy}$ is selected and output by selector 36. Thus, the above-described maximum value limiting process can be carried out.

Samples of an output image from an image processing apparatus employing maximum limiter 31 are shown in FIGS. 39*a*–39*c*. It is appreciated by comparing FIGS. 35*a*–35*c* with FIGS. 39*a*–39*c* that the low density portion is lighter while the maximum density is still maintained.

EIGHTH EMBODIMENT

Figure 40:
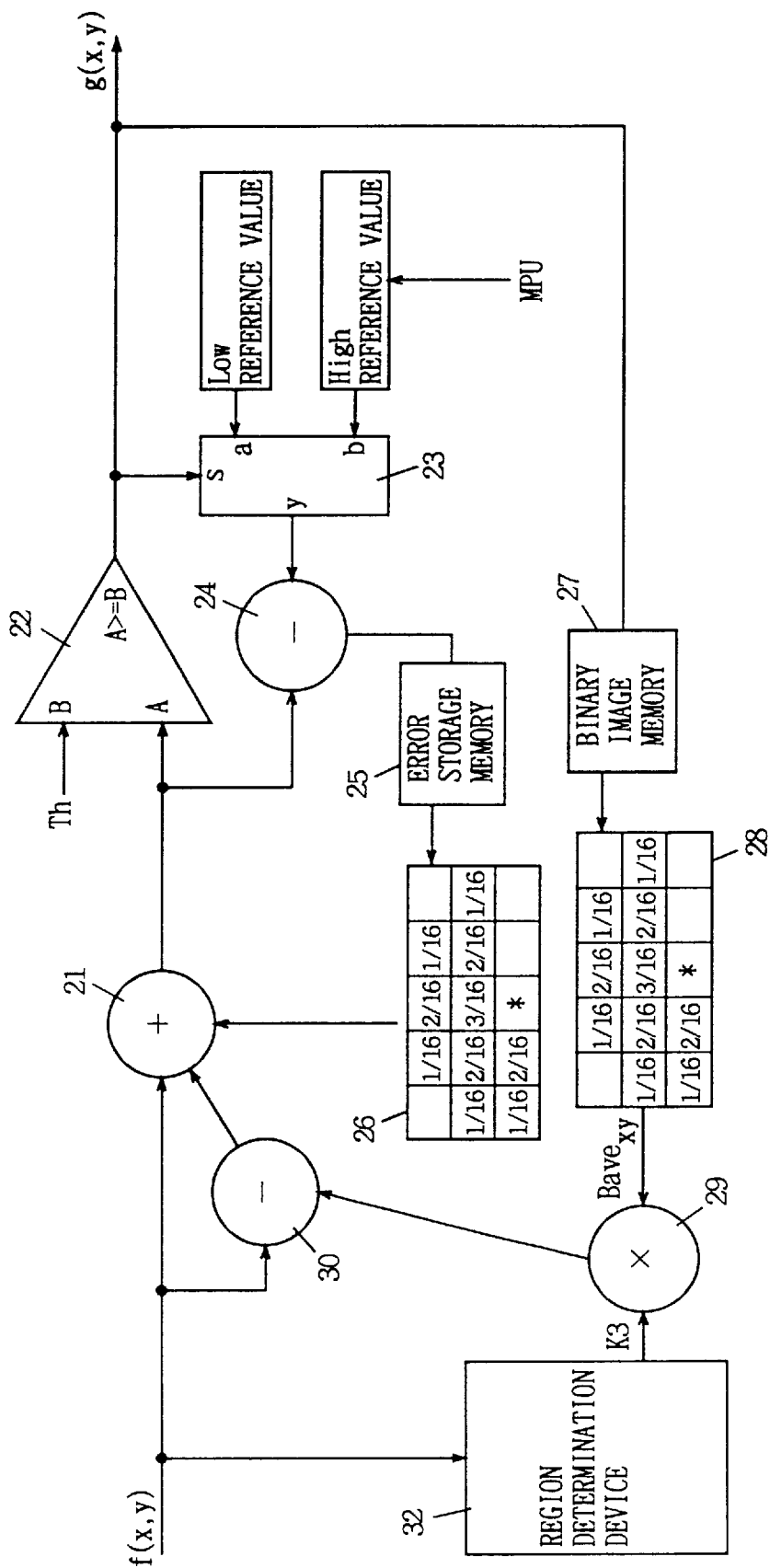
FIG. 40 is a block diagram showing a structure of an image binarization circuit according to an eighth embodiment of the present invention.

An eighth embodiment of an image binarization circuit will be described hereinafter with reference to FIG. 40. The image binarization circuit of FIG. 40 differs from that of the sixth embodiment in that coefficient k1 provided to multiplier 29 is not applied from MPU 11. It is controlled by an output data from a region determination device 32 that carries out region determination according to input image data f (x, y). The remaining components are similar to those of the sixth embodiment. Corresponding components of the same reference characters denoted, and their description will not be repeated.

When binarization average density $Bave_{xy}$ is multiplied by a coefficient k1 smaller than 1 (for example 0.5) the output binarized result always takes a lower density with respect to the input data in the second loop. Therefore, an error correction function canceling this trend is effected in the second loop. Therefore, the gamma characteristic shows a darker one in the line copy region as shown in FIG. 35*c*. It is suitable for reproduction of a line copy image. However, in the case of a photographic original formed of a continuous tone image, the gamma characteristic is preferably the liner characteristic of gamma=1. Therefore, in an original mixed with text and photographic regions, a process of automatically switching to a different value provided by a region determination circuit making determination of the character/photograph region is particularly effective from standpoint of the picture quality and the ease of operability. In this case, coefficient k3 is preferably set to a value less than 1 and to 1 when the pixel corresponds to a text or a photograph, respectively.

Figure 41:
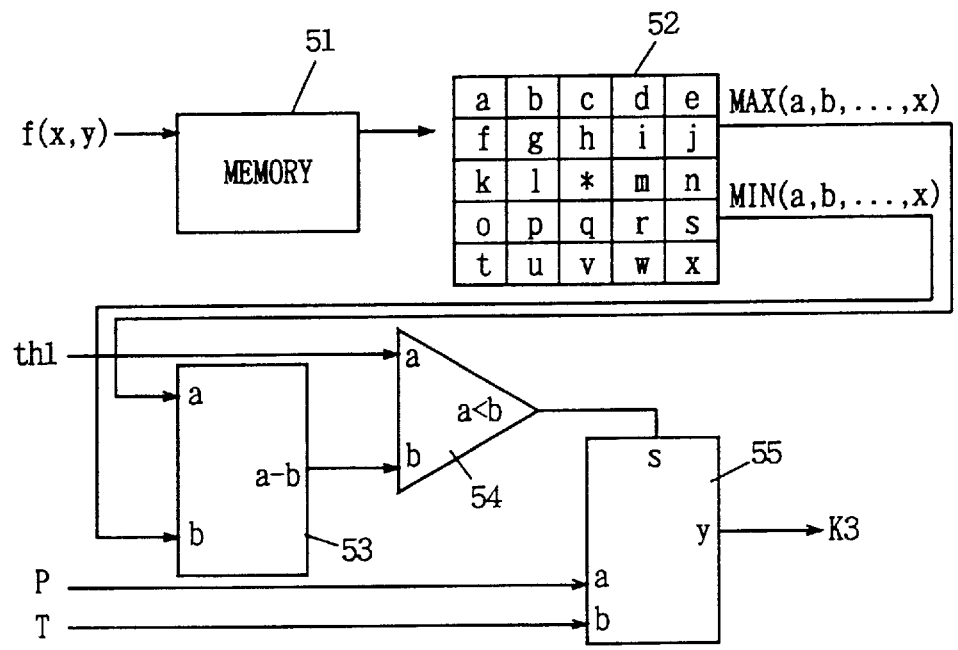
FIGS. 41 and 42 are block diagrams showing specific examples of a region determination device.

A specific structure of the region determination device will be described with reference to FIG. 41. Four lines of input image data f (x, y) is stored by a line memory 51. The maximum value and the minimum value of the 25 pixels are detected using maximum value/minimum value detection filter 52 from a to x in a 5×5 local region. Subtractor 53 calculates the difference between the detected maximum value and the minimum value (maximum value minus minimum value). This difference is compared with region determination threshold value th1 from MPU 11 in comparator 54. Determination is made of a text region when the difference is greater than threshold value th1, whereby a coefficient T for a text region set by MPU 11 (a value smaller than 1) is selected and provided by selector 55. When the subtracted difference is smaller than threshold value th1, determination is made of a photograph region, whereby a coefficient P for a photographic region (for example 1) set by MPU 11 is selected and provided by selector 55.

According to this process, an image of high contrast and high definition is obtained with no fogging of the character region in the background region. The photographic region is reproduced in fidelity with a linear gradation characteristic of gamma=1.

Figure 42:
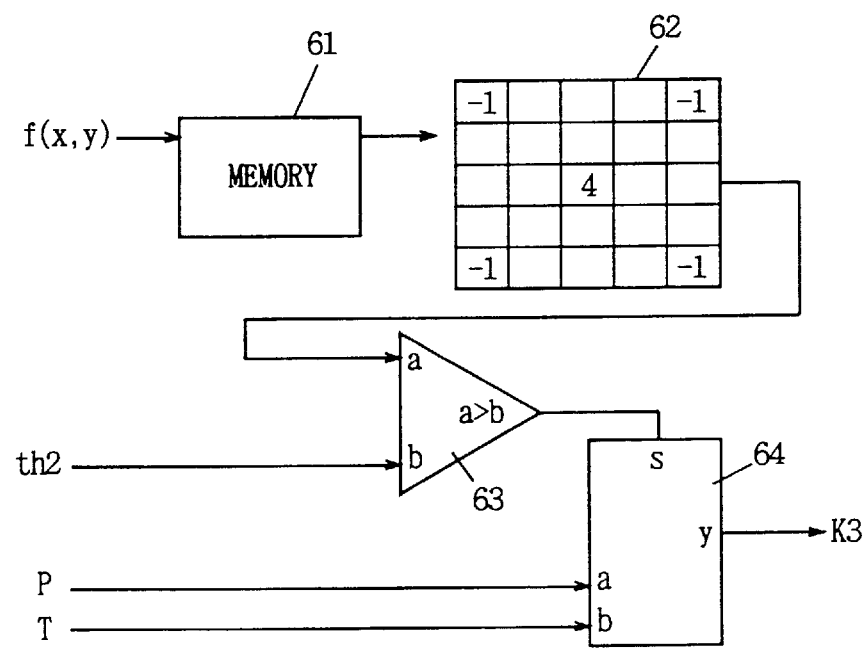

Another specific structure of region determination device 32 will be described with reference to FIG. 42. Five lines of input image data f (x, y) are stored by a memory 61. The edge amount in a 5×5 local area is detected by an edge detection filter 62 formed of a first order differential filter, a quadratic differential filter, or a filter of a combination thereof. Edge detection filter 62 provides an absolute value thereof. The detected absolute value of the edge amount is compared with a region determination threshold value th2 provided from MPU 11 by comparator 63. When the absolute value is greater than threshold value th2, determination is made of a text region, whereby a coefficient T for a text region (a value smaller than 1) set by MPU 11 is selected and provided by selector 62. When the absolute value is smaller than threshold value th2, determination is made of a photographic region, whereby a coefficient P (for example 1) for a photographic region set by MPU 11 is selected and provided by selector 64.

According to this process, an image of high contrast and high definition is obtained with no fogging of the background region on the text region. The photographic region can be reproduced in fidelity with a gradation characteristic of linear gamma=1.

NINTH EMBODIMENT

Figure 43:
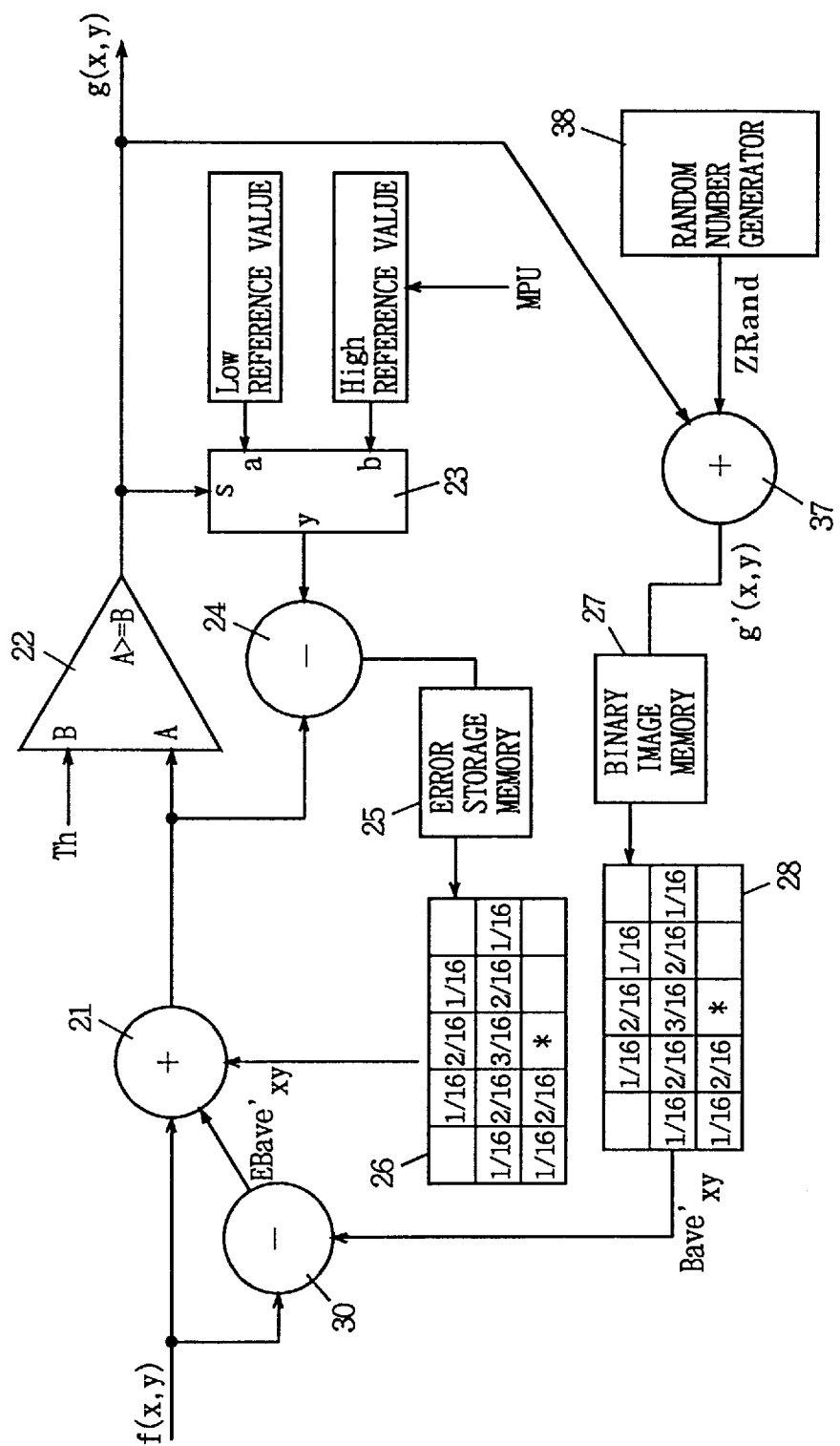
FIG. 43 is a block diagram showing a structure of an image binarization circuit according to a ninth embodiment of the present invention.

FIG. 43 is a block diagram showing a structure of an image binarization circuit according to the ninth embodiment of the present invention. The image binarization circuit of FIG. 43 is similar to the binarization circuit of sixth embodiment shown in FIG. 57 provided that a random number ZRand (randmax) is applied from a random generator 38 using an adder 37 with respect to binarization output data g (x, y). The remaining components are similar to those of the sixth embodiment. Corresponding components have the same reference characters allotted, and their description will not be repeated.

In the ninth embodiment, random number ZRand (randmax) is applied from random number generator 38 to adder 37, to calculate binarization average density $Bave'_{xy}$. Here, ZRand (randmax) is a random number generation function taking a value of –randmax to +randmax.

With the random number added output as g' (x,y), binarization average value as $Bave'_{xy}$, the difference between binarization average value $Bave'_{xy}$ and original image f (x, y) as $EBave'_{xy}$, the respective values can be represented by the following equations (9)–(11).

$$g'(x, y) = g(x, y) + Z\,Rand(\text{randmax}) \tag{9}$$

$$Bave'_{xy} = \frac{1}{\sum\limits_{k,l \in S} \sum m2_{k,l}} \sum\limits_{k,l \in S} m2_{k,l} g'_{x-k, y-l} \tag{10}$$

$$EBave'_{xy} = f(x, y) - Bave'_{xy} \tag{11}$$

In equation (10), $m2_{k,l}$ indicates the coefficient of address (k, l) in binarization average density weighting filter 28.

Input image f (x, y) is corrected using $EBave'_{xy}$.

Figure 44A:
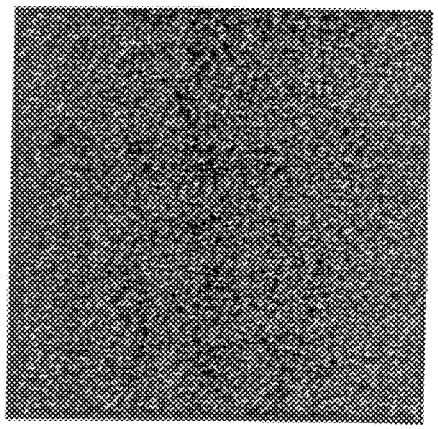
FIGS. 44a and 44b are diagrams for describing the effect of the ninth embodiment.
Figure 44B:
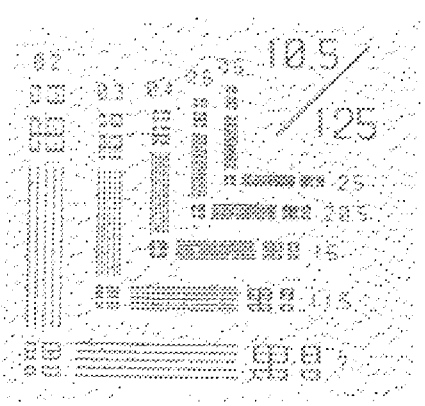

FIGS. 44a and 44b are diagrams for describing the effect of the ninth embodiment and correspond to the conventional FIGS. 28a and 28b. By the nonlinear gamma characteristics of the binarization average density error diffusion method, it is appreciated from FIGS. 44a and 44b that fogging caused by the random number noise in the background region is reduced. Good reproduction of low density thin strokes is achieved. It is further appreciated that the snake-like artifacts in a continuous tone image is reduced.

Here, random number ZRand (randmax) is determined according to the setting of a desired picture quality mode at operation panel 12.

TENTH EMBODIMENT

Figure 45:
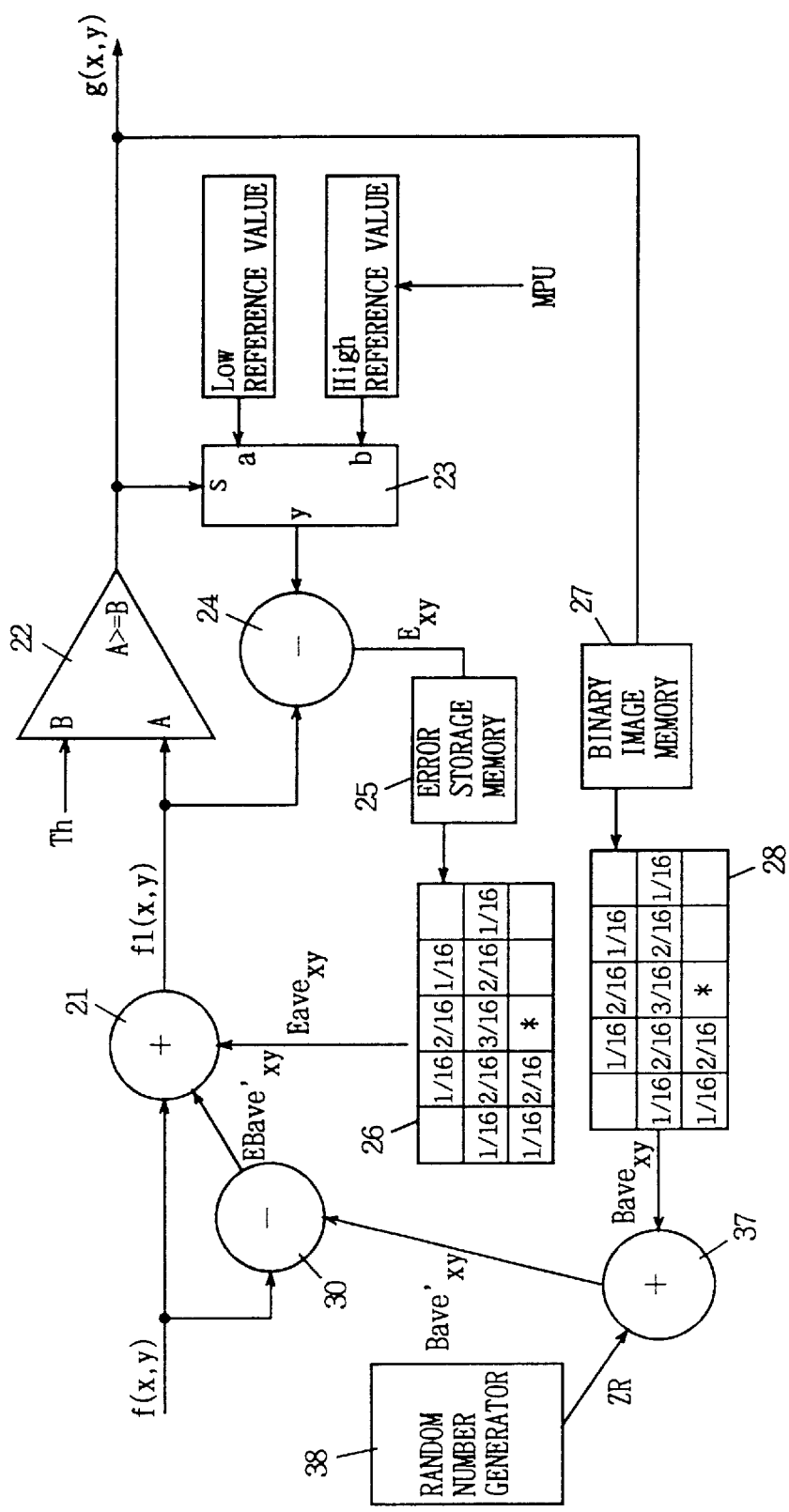
FIG. 45 is a block diagram showing a structure of an image binarization circuit according to a tenth embodiment of the present invention.

FIG. 45 is a block diagram showing a structure of an image binarization circuit according to a tenth embodiment of the present invention. The tenth embodiment differs from the ninth embodiment in that the addition of a random number by number generator 38 is carried out subsequent to binarization average density weighting filter 28.

The remaining components are similar to those of the ninth embodiment, and corresponding components have the same reference characters allotted. Therefore, the description thereof will not be repeated.

Referring to FIG. 45, random number ZRand (randmax) generated by random number generator 38 is added to binarization average error $Bave_{xy}$. This random number is similar to that of the ninth embodiment.

The added result $Bave'_{xy}$ from adder 37 is:

$$Bave'_{xy} = Bave_{xy} + ZRand(\text{randmax}) \tag{12}$$

Figure 46A:
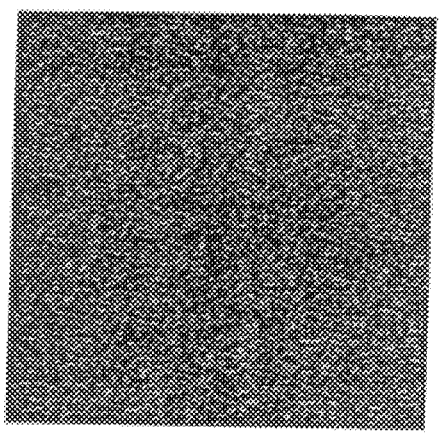
FIGS. 46a and 46b are diagrams for describing the effect of the tenth embodiment.
Figure 46B:
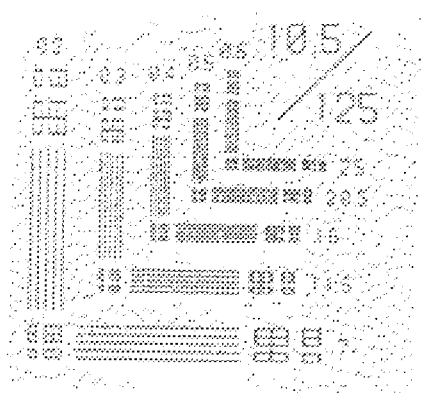

Input image data f (x, y) is corrected using the above-obtained value. The advantage of the present structure will be described with reference to FIGS. 46a and 46b. It is appreciated that fogging due to random number noise in the background region is reduced and the reproduction of low density thin stroke is good with the snake-like artifact of the uniform continuous tone image reduced by virtue of the nonlinear gamma characteristics of the binarization average density error diffusion process.

ELEVENTH EMBODIMENT

If a random number is equally added to all regions of a mixed original including a line copy region and a continuous tone photographic image region in the ninth and tenth embodiments, a jaggy appearance (irregularity) is noticeable at the edge of a line copy region.

Since the aforementioned snake-like artifact is not seen in a line copy region, the addition of a random number is not desirable in consideration of the above problem of a jaggy appearance. It is preferable from the standpoint of picture quality and operability to automatically control the addition of a random number in response to determination of a region of a characteristic/photographic region.

Figure 47:
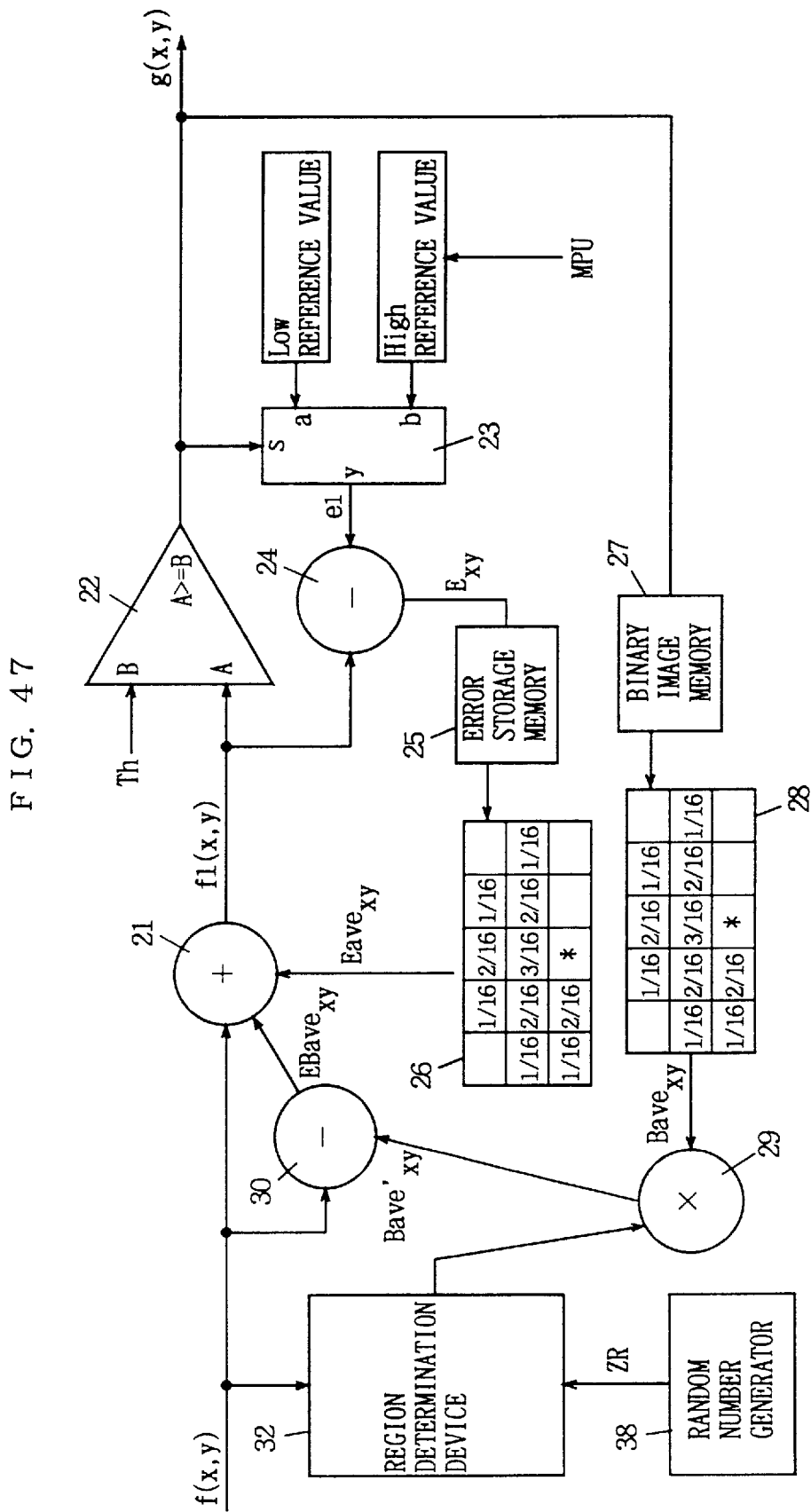
FIG. 47 is a block diagram showing a structure of an image binarization circuit according to an eleventh embodiment of the present invention.

FIG. 47 shows a structure of an image binarization circuit incorporating the determination process of a text/photographic region according to the eleventh embodiment. The image binarization circuit of the eleventh embodiment differs from the image binarization circuit of the eighth embodiment in that a random generator 38 is connected to a region determination device 32. The remaining components are similar to those of the eighth embodiment, and corresponding components have the same reference characters allotted. Region determination device 32 and random generator 38 of the present embodiment are similar to those described in the eighth and ninth embodiments.

Addition of a random number from random number generator 38 is not carried out when determination is made by region determination device 32 that input image data f (x, y) is data of a text region. Addition of a random number from random number generator 38 is carried out upon determination of a photographic region. According to the present embodiment, the problem of a jaggy appearance is eliminated.

The specific structure of region determination device 32 is similar to that of the eighth embodiment, and is not otherwise described herein.

According to the present embodiment, a high definition image is reproduced with the jaggy appearance at the edge due to addition of a random number in a text region and the generation of a snake-like texture in a photographic region suppressed.

The present invention is not limited to the present embodiment where image data of 256 gradation tone levels (256 values) is converted into a binary image data, and can be applied to an image processing apparatus that converts a multi-valued image data into image data of a smaller number of gradation levels, i.e. conversion of a M-ary image data into N-ary image data (M>N).

TWELFTH EMBODIMENT

Prior to the description of the twelfth embodiment, the background art of the present embodiment will first be described.

A serious problem in the error diffusion binarization technique is that rendition of a low density region is not good. Since error diffusion has the gradation level of an image represented by the density of dots with a fixed size, a high frequency image cannot be reproduced in a light density region. In view of the foregoing, the technique of amplifying the amplitude of low density thin strokes to increase the sharpness of the image and improve the reproduction quality of a low density thin stroke by a sharpness correction device 16 employing a conventional Laplacian filter (quadratic differential filter) is employed. However, a sharpness correction circuit in addition to a binarization device for correcting the sharpness due to a Laplacian filter is required. There was a problem that the circuit complexity and the cost of the apparatus are increased.

The twelfth embodiment provides an image processing apparatus of a simple structure and low cost that allows gradation conversion by a high definition error diffusion process.

FIG. 48 is a block diagram showing the main components of an image processing apparatus according to the twelfth embodiment. Referring to FIG. 48, an image binarization device of the image processing apparatus of the twelfth embodiment additionally includes with respect to a conventional image binarization device, a binary image memory 27 receiving output image density g (x, y) for storing three lines of such binary image data, a binary image integral filter 56 receiving binary image data g (x, y) from binary image memory 27 for producing integral data $Bint_{xy}$ taking the weighting average of the binarization result of the periphery of the target of interest, a binary image differential filter 57 receiving binary image data g (x, y) from the binary image memory for producing differential data which is the quadratic differential value of the binarization result of the periphery of the pixel of interest, an adder 58 for adding integral data $Bint_{xy}$ and differential data $Bdiffer_{xy}$, and a subtractor 59 to produce difference data $EBave_{xy}$ between added data $Bave_{xy}$ from adder 58 and input image data f (x, y). By the addition of difference data $EBave_{xy}$ to input image data f (x, y) by adder 21, a second operation loop for dispersing the binarization average error to the peripheral pixels is formed.

The operation thereof will be described hereinafter. Multivalued image density data f (x, y) is applied to adder 21. Error correction data f1 (x, y) that is error-corrected by adder 21 is binarized with a fixed binarization threshold value Th in comparator 22. The binarized output image density g (x, y)=(0 or 1) is applied to selector 23 and binary image memory 27. Error data e1 (x, y) selected by selector 23 according to a predetermined reference value is applied to subtractor 24. Subtractor 24 provides binarization error $E_{xy}$ which is stored of three lines in error memory 25. Weighting average value $Eave_{xy}$ for diffusing binarization error $E_{xy}$ to other pixels is calculated using error weighting filter 26. This value is described in equation (7).

Output image density data g (x, y) applied to binary image memory 27 is integrated with binary image integral filter 56, whereby binary image integral value $Bint_{xy}$ represented by the following equation (13) is obtained. Output image data g (x, y) is applied to binary image differential filter 29, whereby binary image differential value $Bdiffer_{xy}$ represented by the following equation (14) is obtained.

$$Bint_{xy} = \frac{1}{\sum\sum_{k,l\in S} m2_{k,l}} \sum_{k,l\in S} m2_{k,l} g_{x-k,y-l} \quad (13)$$

$$Bdiffer_{xy} = \frac{1}{\sum\sum_{k,l\in S} m3_{k,l}} \sum_{k,l\in S} m3_{k,l} g_{x-k,y-l} \quad (14)$$

Here, $Bdiffer_{xy}$, $Bave_{xy}$ and $Ebave_{xy}$ represent the values of differential data, added data, and difference data with respect to the pixel of address (x, y).

In equation (13), $m2_{k,l}$ is the weighting integral coefficient of total sum=1 that has the greatest weight at the center as shown in binary image integral filter 56. In equation (14), $m3_{k,l}$ is the quadratic differential coefficient of total sum=0 as shown in binary image differential filter 29. These are both the coefficients of address (k, l), in each filter as in equation (7).

Edge-enhanced binarization average value $Bave_{xy}$ represented by the following equation (15) is obtained by adding binary image differential value $Bdiffer_{xy}$ to binary image integral value $Bint_{xy}$ by adder 10. Difference $Ebave_{xy}$ represented by the following equation (16) is obtained which is the difference between binarization average value $Bave_{xy}$ and original image data f (x, y) by subtractor 31. Input image data f (x, y) is corrected by adder 21 on the basis of $EBave_{xy}$ and the peripheral error weighting average value $Eave_{xy}$.

$$Bave_{xy}=Bint_{xy}+Bdiffer_{xy} \quad (15)$$

$$EBave_{xy}=f(x, y)-Bave \quad (16)$$

Figure 49A:
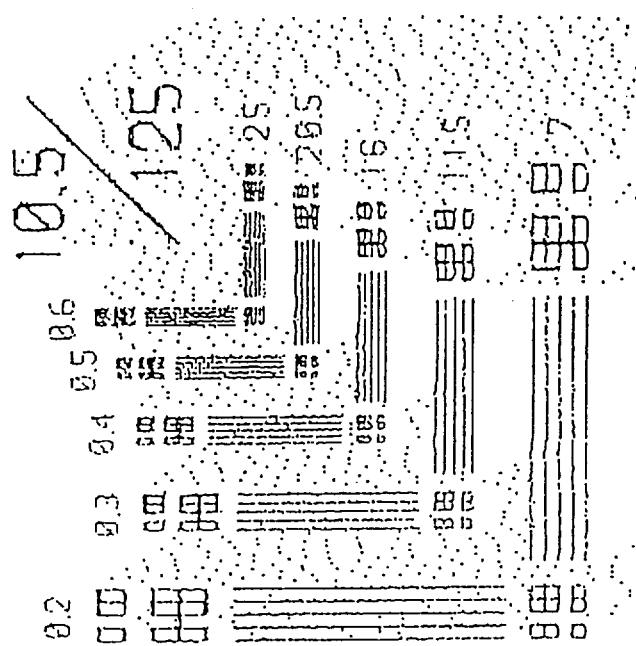
FIGS. 49a and 49b are diagrams for describing the effect of a twelfth embodiment of the present invention.
Figure 49B:
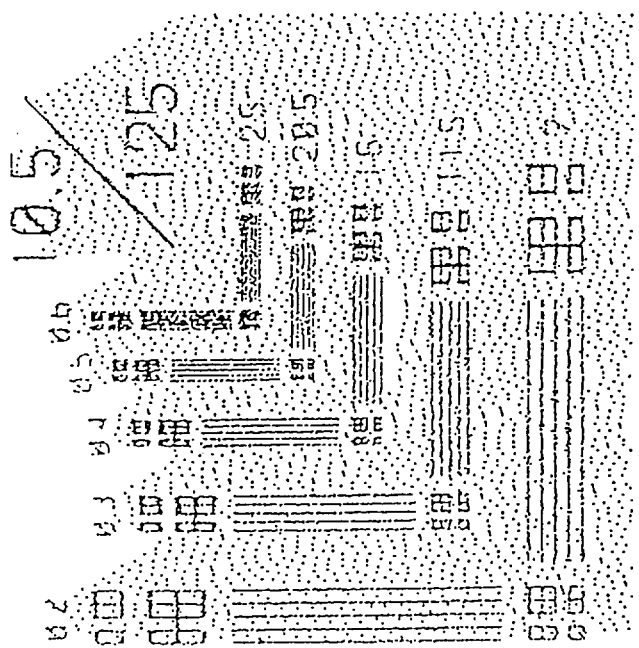

The advantage of this correction is appreciated by comparing FIG. 49*a* showing a conventional error diffused image with FIG. 49*b* showing an image according to the twelfth embodiment of the present invention. It is appreciated that a high definition image having the edge enhanced and of good contrast is obtained.

THIRTEENTH EMBODIMENT

Figure 50:
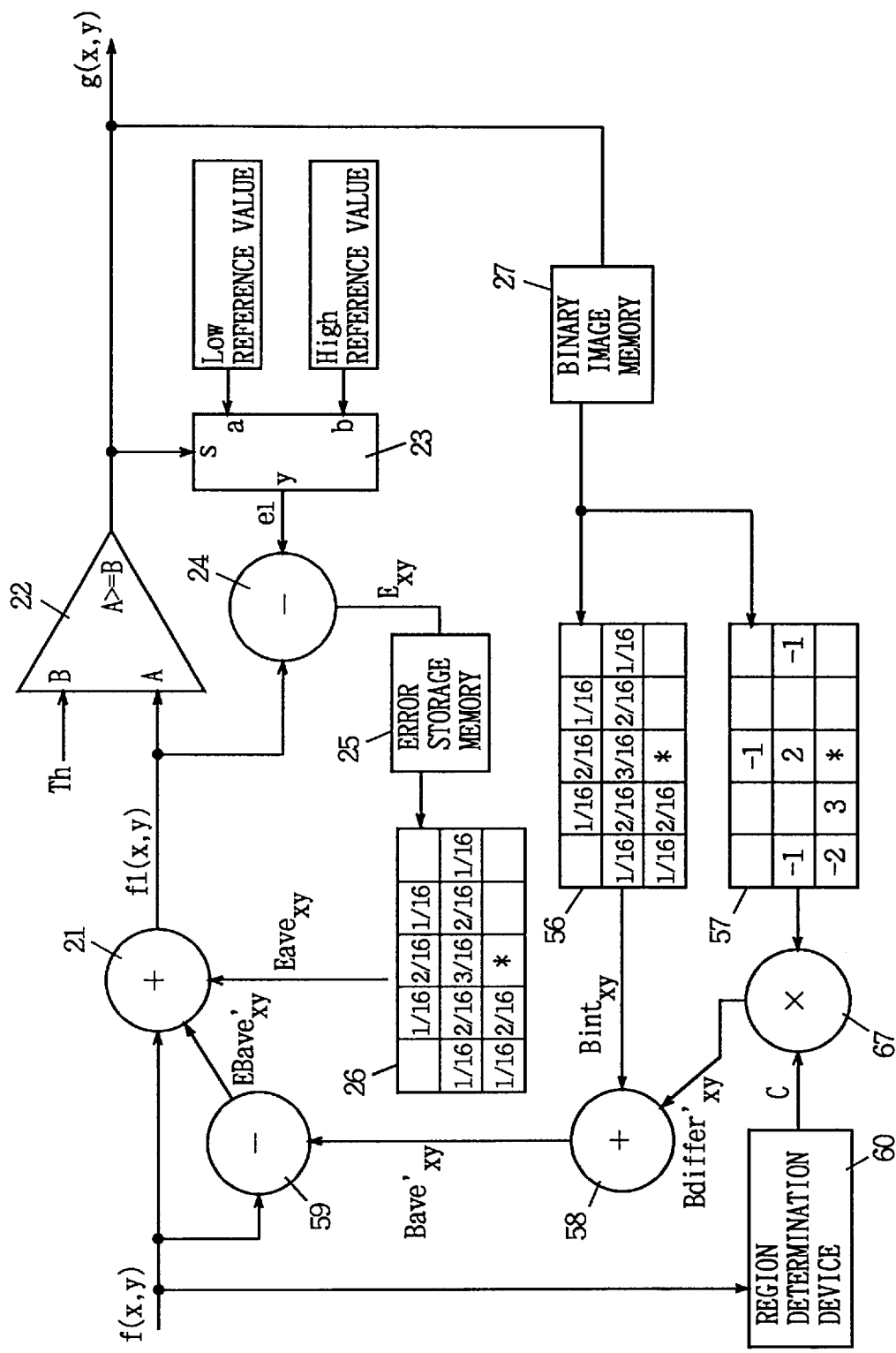
FIG. 50 is a block diagram showing an image binarization device according to a thirteenth embodiment of the present invention.

FIG. 50 is a block diagram showing a structure of the thirteenth embodiment of the present invention. The thirteenth embodiment differs from the twelfth embodiment in that a region determination device 60 for identifying the characteristic of the region of input image data f (x, y) is provided. According to the thirteenth embodiment, determination is made whether the region of input image data f (x, y) is a text region or a photographic region. According to the determination result, multiplier 67 multiplies binary image differential value $Bdiffer_{xy}$ by a constant C to provide $Bdiffer'_{xy}$ represented by the following equation (17). The remaining components are similar to those of the twelfth embodiment, and corresponding components have the same reference characters allotted.

A specific operation of region determination device 60 will be described hereinafter. If all regions in a mixed format original of a line copy area and a continuous tone photographic image have the edge equally enhanced, the edge will be undesirably enhanced in the photographic region. The picture quality and the operability can be improved by making determination whether the input image data is of a text region or a photographic image region to automatically control increment/decrement of a constant C.

When determination is made that the input image data is of a text region, region determination device 60 increases constant C greater than that of a photographic region to increase the edge enhancement amount. As a result, an image of high sharpness can be obtained. Constant C is set to a value lower than that of a text region when determination is made of a photographic region. The edge enhancement amount is reduced to obtain an image of low sharpness.

Multiplied data $Bdiffer'_{xy}$ having the edge enhancement amount adjusted is added with output $Bint_{xy}$ from binary image integral filter 56 to result in binarization average value $Bave'_{xy}$ represented by the following equation (18). The difference $EBave'_{xy}$ (equation (19)) between $Bave'_{xy}$ and original image data f (x, y) are added by adder 21.

$$Bdiffer'_{xy}=Bdiffer_{xy}\times C \quad (17)$$

$$Bave'_{xy}=Bint_{xy}+Bdiffer'_{xy} \quad (18)$$

$$EBave'_{xy}=f(x, y)-Bave'_{x,y} \quad (19)$$

According to the thirteenth embodiment, an image with the edge adjusted appropriately is obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
    a first calculation loop including
        binarization means for binarizing an input image data of a pixel of interest with a predetermined threshold value,
        calculation means for calculating error between data binarized by said binarization means and said input image data of said pixel of interest,
        an error diffusion line memory for storing a plurality of lines of error calculated by said calculation means,
        a first filter for diffusing error stored in said error diffusion line memory to peripheral pixels of said pixel of interest, and
        means for feeding back an error outputted from said first filter to said input image data; and
    a second calculation loop including
        a binarization image memory for storing a plurality of lines of said binarized image data,
        an integral filter for producing integral data taking a weighting average of peripheral binary results of said pixel of interest according to binarized image data from said binarization image memory,
        a differential filter for producing differential data taking peripheral quadratic differential values of said pixel of interest according to binary image data from said binarization image data,
        adding means for adding said integral data and said differential data,
        calculation means for calculating a difference between said input image data and an added result from said adding means, and
        means for feeding back an output from said calculation means to said input image data.

2. The image processing apparatus according to claim 1, further comprising:
    multiplication means for multiplying said differential data by a desired ratio, wherein said adding means adds said multiplied result and said integral data, and calculation means calculates a difference between said added result and said input image data.

3. The image processing apparatus according to claim 1, further comprising:
    region determination means for making determination of a characteristic of said input image data,
    means for setting a predetermined multiplier coefficient according to a determination result of said region determination means,
    multiplication means for multiplying said differential data by said multiplier coefficient, wherein said adding means adds said multiplied result and said integral data, and calculation means calculates a difference between said added result and said input image data.

4. The image processing apparatus according to claim 3, wherein said region determination means makes determination of a region by calculating a maximum value/a minimum value of said input image data.

5. The image processing apparatus according to claim 3, wherein said region determination means comprises means for detecting an edge of said input image data for making determination of a region according to said edge detection result.

6. An image processing apparatus comprising:
    N-ary means for converting M-ary input image data of a pixel of interest into N-ary image data where N is smaller than M with a predetermined threshold value,
    average value calculation means for calculating an average of a plurality of said N-ary image data,
    average error calculation means for calculating average error data for N-ary conversion from said input image data of said pixel of interest and said average value, and
    means for feeding back said average error data for N-ary conversion to said input image data.

7. The image processing apparatus according to claim 6, further comprising:
    error calculation means for calculating error between said N-ary image data from said N-ary means and said input image data, and
    second feedback means for feeding back said error by said error calculation means to said input image data.

8. An image processing apparatus comprising:
    binarization means for binarizing a multi-valued input image data of a pixel of interest with a predetermined threshold value,
    calculation means for calculating error between data binarized by said binarization means and said input image data of said pixel of interest,
    an error diffusion line memory for storing a plurality of lines of said error calculated by said calculation means,
    a first filter for diffusing error stored in said error diffusion line memory to peripheral pixels of said pixel of interest,
    a binary image data line memory for storing a plurality of lines of said binarized image data,
    a second filter for calculating an average of a plurality of binary image data,
    average error calculation means for calculating average error data for binarization from said input image data and an output value from said second filter, and
    means for feeding back to said input image data an error outputted from said first filter and an average error data outputted from said average error calculation means.

9. An image processing apparatus comprising:
    conversion means for converting input image data of L values into image data of M values where M is smaller than said L,
    N-ary conversion means for converting said image data of M values into data of N values where N is smaller than said M with a predetermined threshold value,
    first error diffusion data calculation means for calculating first error data which is the error between said image data of M values and said image data of N values,
    second error diffusion data calculation means for calculating second error data which is the error between an average of a plurality of N-ary image data and said input image data,
    attribute determination means for determining an attribute of said input image data,
    adjustment means for adjusting said second error data according to a determination result of said attribute determination means, and
    feedback means for feeding back said first error data calculated by said first error diffusion data calculation means and said second error data adjusted by said adjusting means to said input image data.

10. An image processing apparatus comprising:

conversion means for converting input image data of 8 bits of a pixel of interest into image data of 4 bits by a dither process, binarization means for binarizing said image data of 4 bits with a predetermined threshold value, calculation means for calculating first error data which is the error between binarized data from said binarization means and said converted image data of 4 bits of said pixel of interest, a line memory for storing a plurality of lines of said first error data calculated by said calculation means, an error diffusion filter for diffusing said first error data stored in said line memory to peripheral pixels of said pixel of interest, binary image data line memory for storing a plurality of lines of said binarized image data, an average value calculation filter for calculating an average value of a plurality of said binary image data, attribute determination means for making determination of a distributed state of an image from a maximum value/minimum value of a local region on the basis of said input image data, adjusting means for adjusting binarization average error data for error diffusion provided from said average value calculation filter according to a determination result of said attribute determination means, and means for feeding back an output from said error diffusion filter and second error data adjusted by said adjusting means to said input image data.

11. An image processing apparatus comprising:

N-ary means for converting M-ary input image data of a pixel of interest into N-ary data where N is smaller than said M with a predetermined threshold value, N-ary image memory for storing a plurality of lines of said N-ary image data, a filter for calculating an average value of an N-ary result of peripheral pixels of said pixel of interest, multiplication means for multiplying said average value for N-ary conversion by an arbitrary coefficient, calculation means for calculating a difference between said input image data and a multiplied result of said multiplication means, and means for feeding back an output from said calculation means to said input image data.

12. An image processing apparatus comprising:

a first calculation loop including binarization means for binarizing a multi-valued input image data of a pixel of interest with a predetermined threshold value, calculation means for calculating error between data binarized by said binarization means and said input image data of said pixel of interest, an error diffusion line memory for storing a plurality of lines of error calculated by said calculation means, a first filter for diffusing error stored in said error diffusion line memory to peripheral pixels of said pixel of interest, and means for feeding back an error outputted from said first filter to said input image data; and a second calculation loop including a binarization image memory for storing a plurality of lines of said binarized image data, a second filter for calculating an average value of peripheral binarized results of said pixel of interest, multiplication means for multiplying said average value for binarization by an arbitrary coefficient, calculation means for calculating a difference between said input image data and a multiplied result of said multiplication means, and means for feeding back an output from said calculation means to said input image data.

13. The image processing apparatus according to claim 12, further comprising maximum value limiting means for limiting a maximum value of said multiplied result.

14. The image processing apparatus according to claim 12, further comprising region determination means for making determination of a characteristic of said input image data, wherein said coefficient is controlled according to a determination result of said region determination means.

15. The image processing apparatus according to claim 14, wherein said region determination means makes determination of a region by calculating a maximum value and a minimum value of said input image data.

16. The image processing apparatus according to claim 14, wherein said region determination means comprises means for detecting an edge of said input image data, wherein determination is made of a region according to said edge detection result.

17. The image processing apparatus according to claim 15, wherein said region determination means makes determination of a text region or a photographic region of said region to set said coefficient to a value smaller than 1 when said region is a text region.

18. An image processing apparatus comprising:

N-ary means for converting M-ary input image data of a pixel of interest into an N-ary data where N is smaller than said M with a predetermined threshold value, an N-ary image memory for storing a plurality of lines of said N-ary image data, a filter for calculating an average value of peripheral N-ary results of said pixel of interest, multiplication means for multiplying said average value for N-ary conversion by a random number, calculation means for calculating a difference between said input image data and a multiplied result of said multiplication means, and means for feeding back an output from said calculation means to said input image data.

19. An image processing apparatus comprising:

N-ary means for converting M-ary input image data of a pixel of interest into N-ary image data where N is smaller than said M with a predetermined threshold value, multiplication means for multiplying said N-ary image data by a random number, an N-ary image memory for storing a plurality of lines of image data having a random number multiplied, a filter for calculating an average value of peripheral N-ary results of said pixel of interest, calculation means for calculating a difference between said input image data and an output result from said filter, and means for feeding back an output from said calculation means to said input image data.

20. An image processing apparatus comprising:

a first calculation loop including binarization means for binarizing a multi-valued input image data of a pixel of interest with a predetermined threshold value, calculation means for calculating error between data binarized by said binarization means and said input image data of said pixel of interest, an error diffusion line memory for storing a plurality of lines of error calculated by said calculation means, a first filter for diffusing error stored in said error diffusion line memory to peripheral pixels of said pixel of interest, and means for feeding back an error outputted from said first filter to said input image data; and a second calculation loop including a binarization image memory for storing a plurality of lines of said binarized image data, a second filter for calculating an average value of peripheral binarized results of said pixel of interest, multiplication means for multiplying said average value for binarization by a random number, calculation means for calculating a difference between said input image data and a multiplied result of said multiplication means, and means for feeding back an output from said calculation means to said input image data.

21. The image processing apparatus according to claim 20, further comprising an operation panel, wherein a random number is set according to setting of a desired picture quality mode from said operation panel.

22. The image processing apparatus according to claim 20, further comprising region determination means for making determination of a characteristic of said input image data, wherein said random number is controlled according to a determination result of said region determination means.

23. The image processing apparatus according to claim 22, wherein said region determination means makes determination of a region by calculating a maximum value and a minimum value of said input image data.

24. The image processing apparatus according to claim 22, wherein said region determination means comprises means for detecting an edge of said input image data, wherein determination is made of a region according to said edge detection result.

25. The image processing apparatus according to claim 23, wherein said region determination means makes determination of a text region or a photographic region of said region, wherein said means for multiplying a random number multiplies a random number smaller than that of said photographic region when said region is a text region.

26. An image processing apparatus comprising:

an N-ary means for converting M-ary input image data of a pixel of interest into N-ary image data where N is smaller than said M with a predetermined threshold value, an N-ary image memory for storing a plurality of lines of said N-ary image data, an integral filter for producing integral data taking a weighting average of peripheral N-ary results of said pixel of interest according to N-ary image data from said N-ary image memory, a differential filter for producing differential data taking a quadratic differential value of said pixel of interest according to N-ary image data from said N-ary image memory, adding means for adding said integral data and said differential data, calculation means for calculating a difference between said input image data and an added result from said adding means, and means for feeding back an output from said calculation means to said input image data.

27. The image processing apparatus according to claim 4, wherein said region determination means makes determination of a text region or a photographic region of said region, wherein said means setting a multiplier coefficient multiplies a coefficient higher than that of said photographic region when said region is a text region.

28. The image processing apparatus aaccording to claim 16, wherein said region determination means makes determination of a text region or a photographic region of said region to set said coefficient to a value smaller than 1 when said region is a text region.

29. The image processing apparatus according to claim 24, wherein said region determination means makes determination of a text region or a photographic region of said region, wherein said means for multiplying a random number multiplies a random number smaller than that of said photographic region when said region is a text region.

30. The image processing apparatus according to claim 5, wherein said region determination means makes determination of a text region or a photographic region of said region, wherein said means setting a multiplier coefficient multiplies a coefficient higher than that of said photographic region when said region is a text region.

* * * * *